US006647171B1

(12) United States Patent
Fu et al.

(10) Patent No.: US 6,647,171 B1
(45) Date of Patent: Nov. 11, 2003

(54) MEMS OPTICAL SWITCH ACTUATOR

(75) Inventors: Xiaodong R. Fu, Painted Post, NY (US); David W. Lambert, Corning, NY (US); Paul P. Merchant, Corning, NY (US)

(73) Assignee: Corning Incorporated, Corning, NY (US)

( * ) Notice: Subject to any disclaimer, the term of this patent is extended or adjusted under 35 U.S.C. 154(b) by 166 days.

(21) Appl. No.: 09/728,474

(22) Filed: Dec. 1, 2000

(51) Int. Cl.$^7$ .................................................. G02B 6/26
(52) U.S. Cl. .......................................... 385/18; 385/129
(58) Field of Search .............................. 385/18, 6, 2, 8, 385/14, 15, 16, 40, 57, 88, 129

(56) References Cited

U.S. PATENT DOCUMENTS

| | | | | |
|---|---|---|---|---|
| 5,969,848 A | * | 10/1999 | Lee et al. | 359/298 |
| 5,998,906 A | * | 12/1999 | Jerman et al. | 310/309 |
| 6,028,689 A | * | 2/2000 | Michalicek et al. | 359/224 |
| 6,040,935 A | * | 3/2000 | Michalicek | 359/198 |
| 6,329,737 B1 | * | 12/2001 | Jerman et al. | 310/309 |
| 6,384,510 B1 | * | 5/2002 | Grade et al. | 310/309 |

* cited by examiner

Primary Examiner—Frank G. Font
Assistant Examiner—Kevin Kianni
(74) Attorney, Agent, or Firm—Joanne N. Pappas

(57) ABSTRACT

A micro-electro-mechanical system (MEMS) optical switch actuator and method for fabricating the actuator provide an anchor assembly that functions as a second electrode. The actuator has a reflective element assembly and a first electrode assembly for moving the reflective element assembly from a first position to a second position based on a switching signal. The actuator further includes an anchor assembly coupled to the reflective element assembly such that a spring force is generated in the reflective element assembly when the reflective element assembly is in the second position. The anchor assembly is electrically conductive such that the switching signal generates an electrostatic force between the anchor assembly and the first electrode assembly. The method for fabricating the actuator includes the step of coupling a multi-level reflection assembly to an optical circuit. The reflection assembly has an electrically conductive anchor assembly positioned at a first level with respect to the optical circuit and a mirror positioned at a second level with respect to the optical circuit. An insulative mirror beam layer is then coupled to the reflection assembly, and an electrode assembly is coupled to the mirror beam layer. The electrode assembly is coupled such that a voltage potential between the anchor assembly and the electrode assembly causes the electrode assembly to force the mirror beam layer and the mirror from the first switching position to the second switching position.

5 Claims, 27 Drawing Sheets

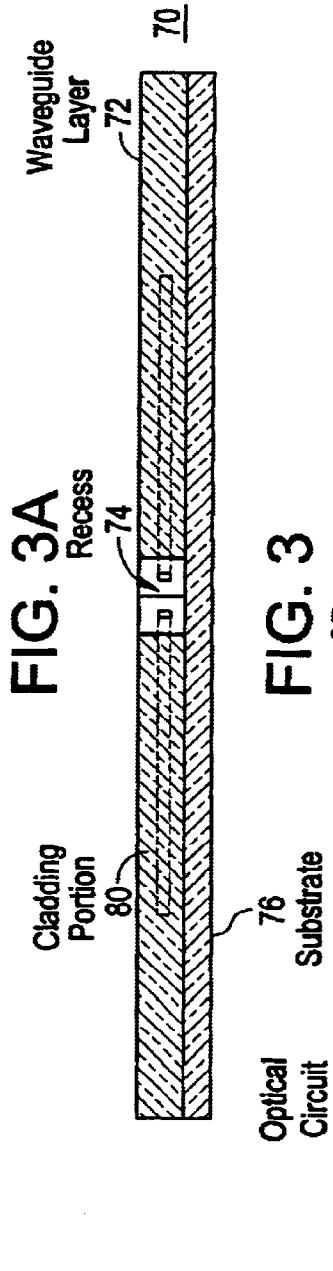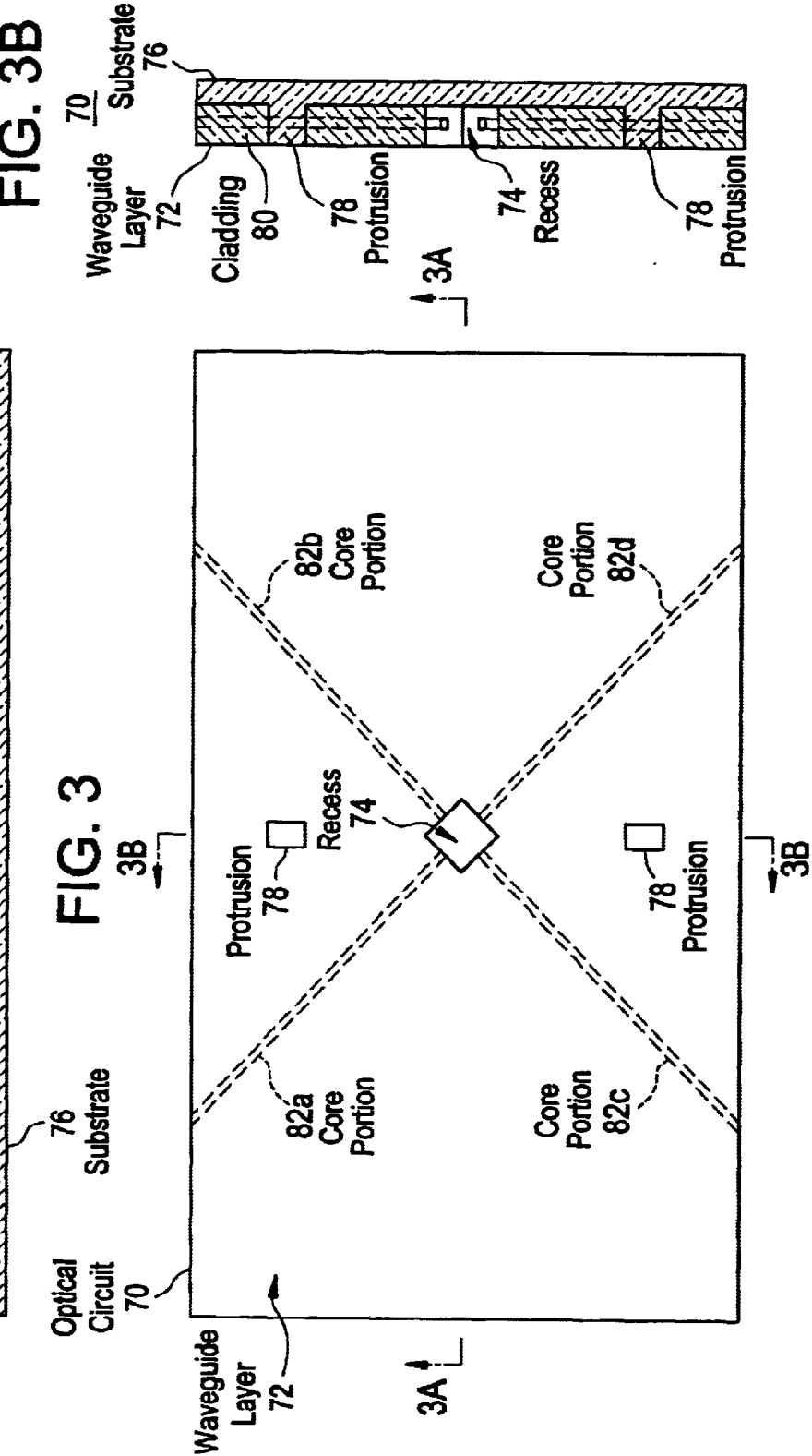

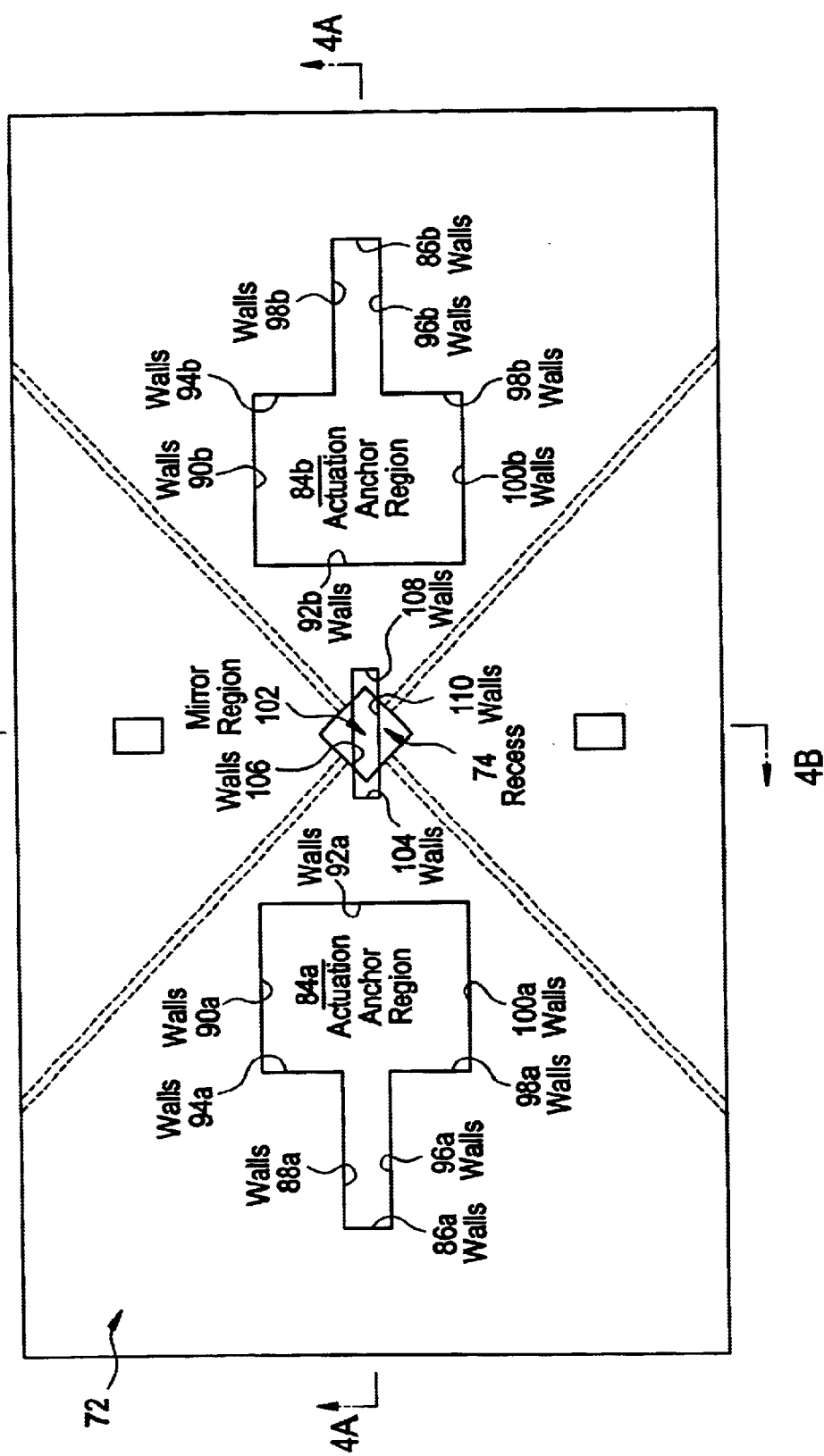

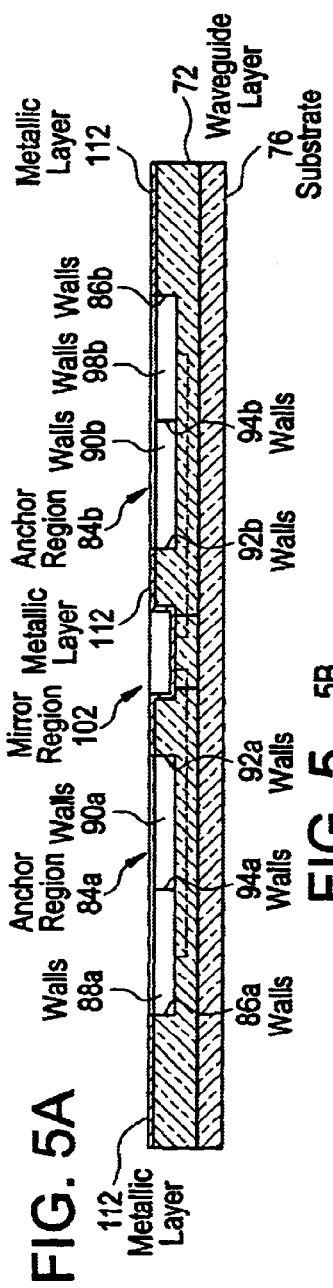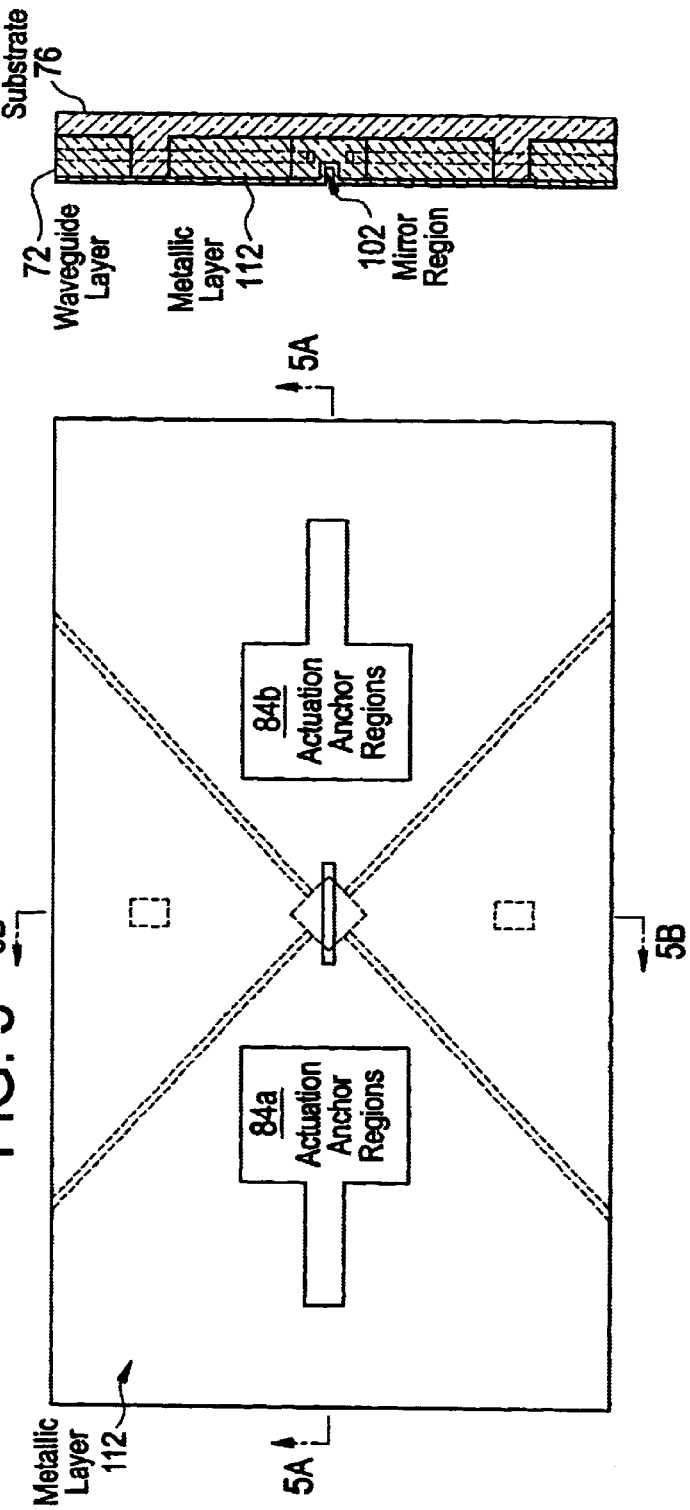

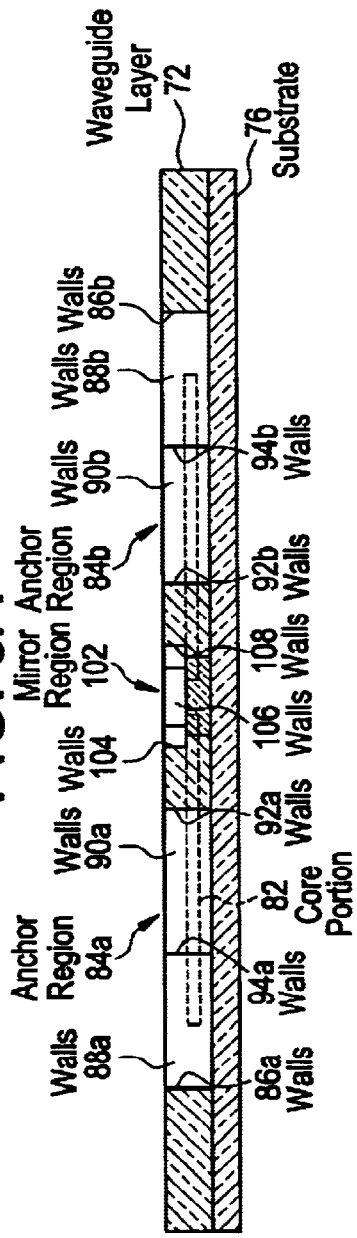

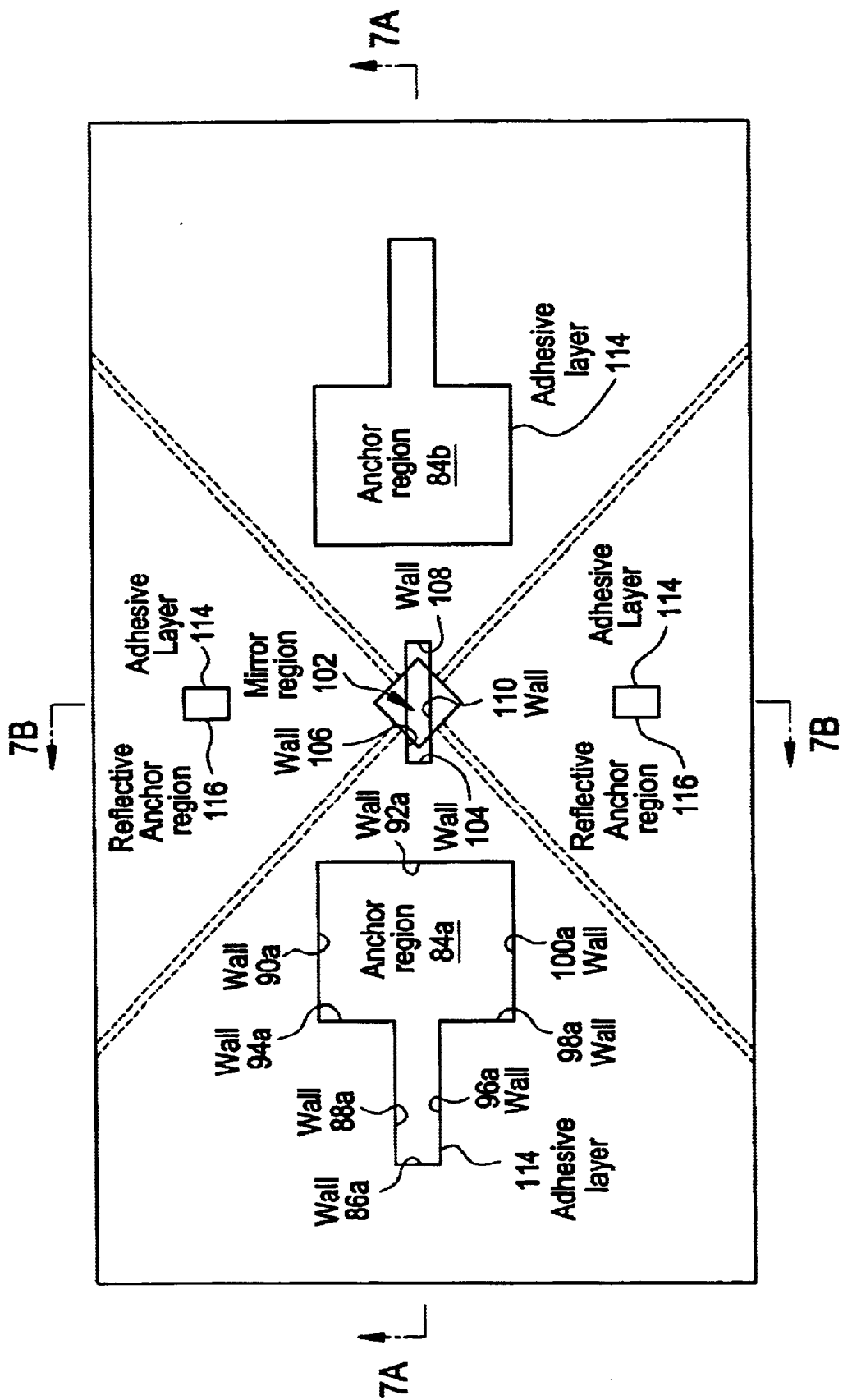

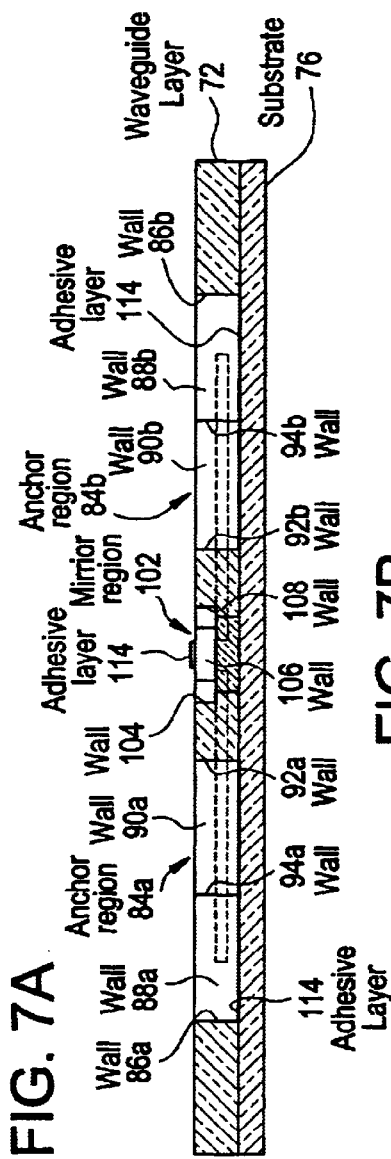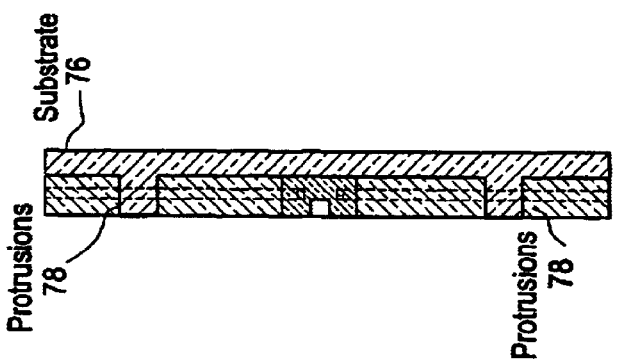

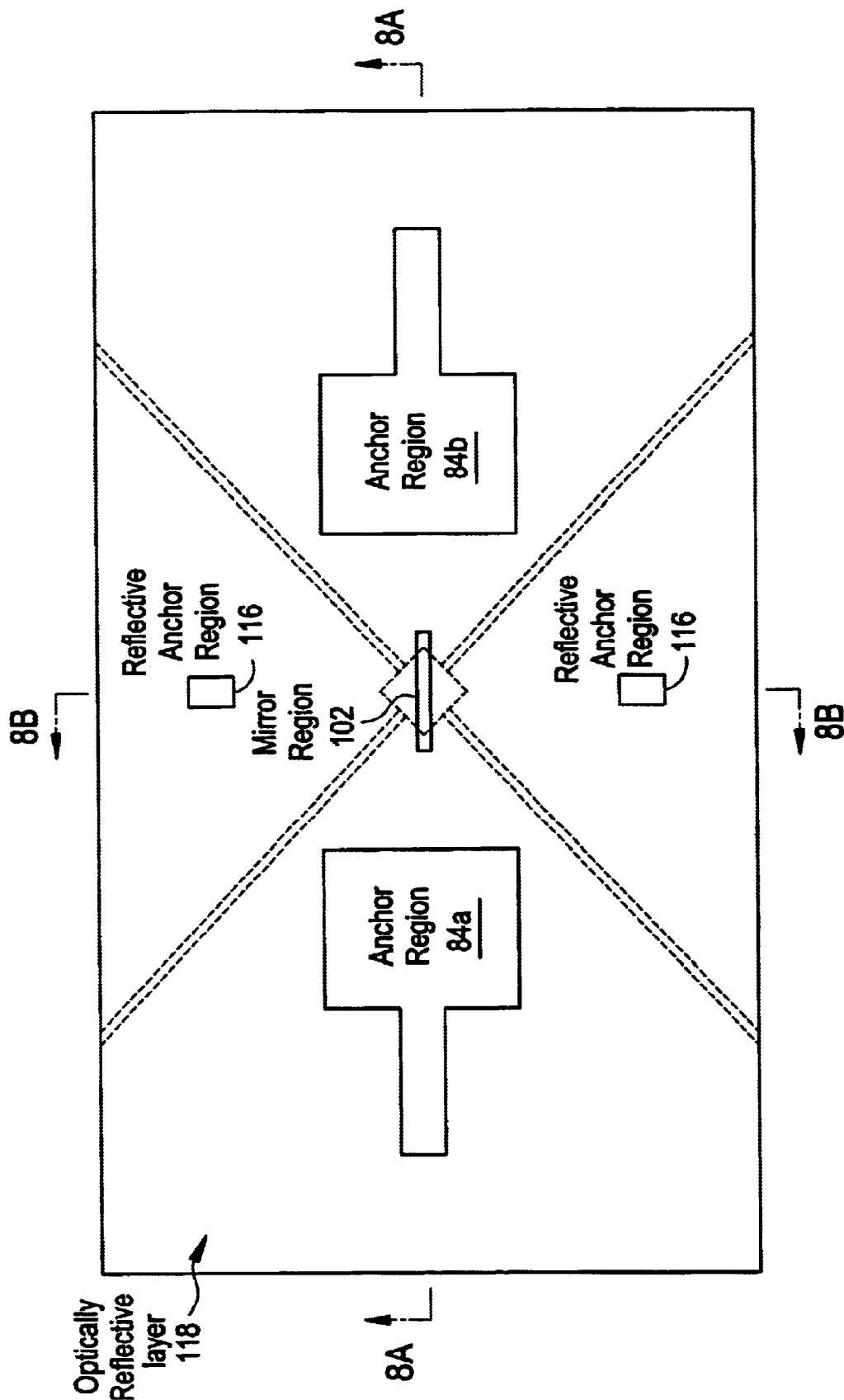

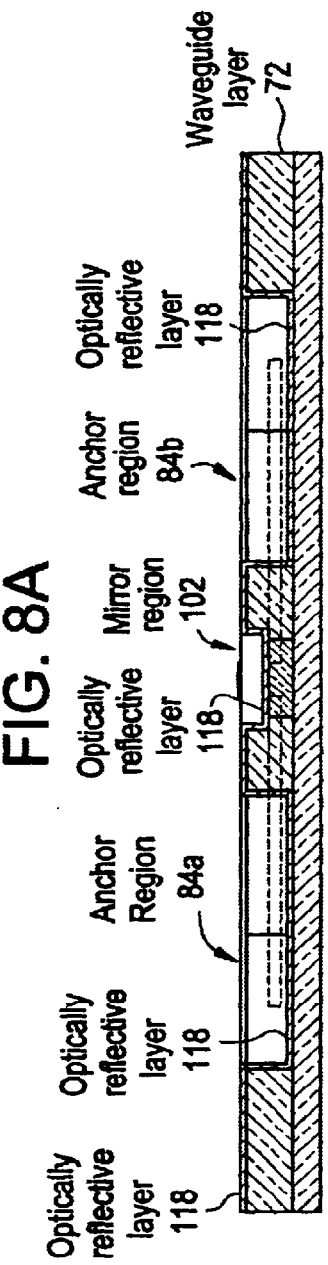

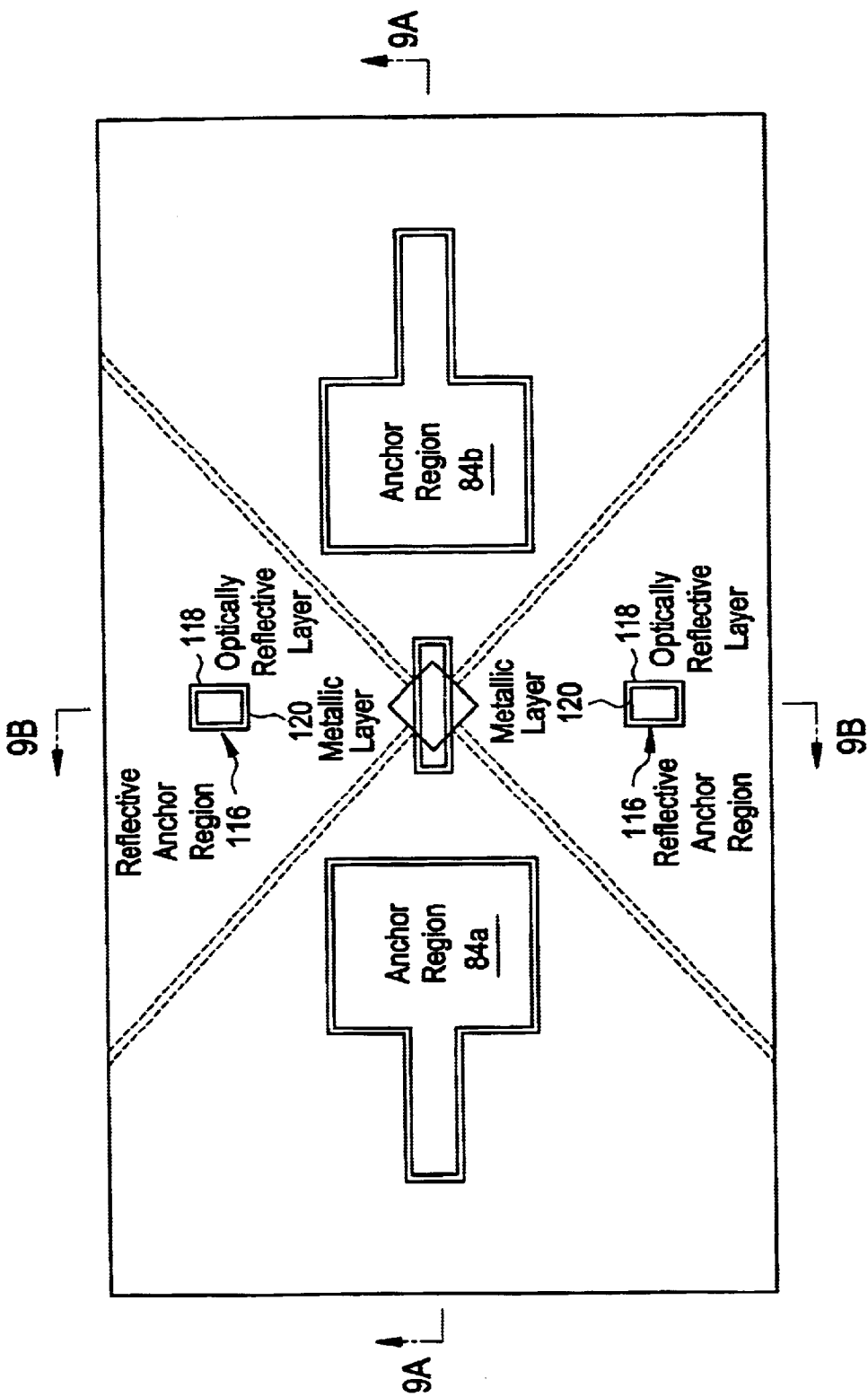

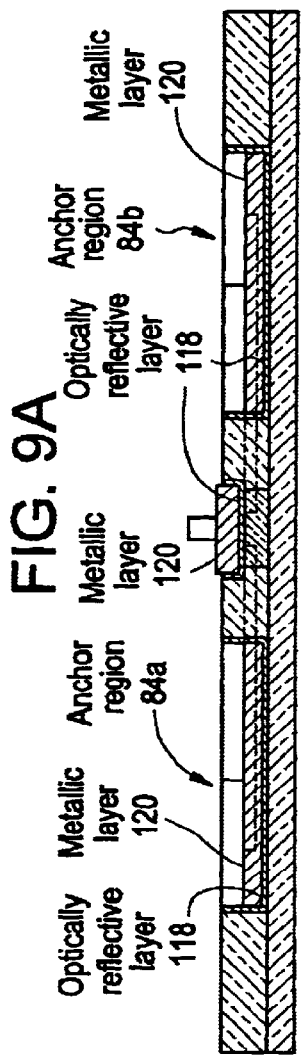
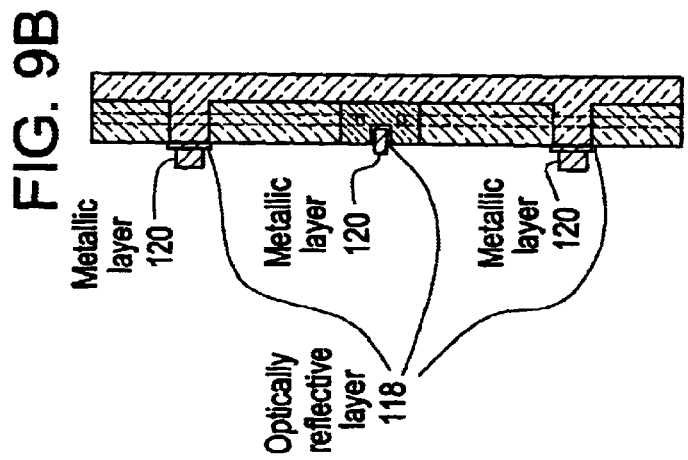

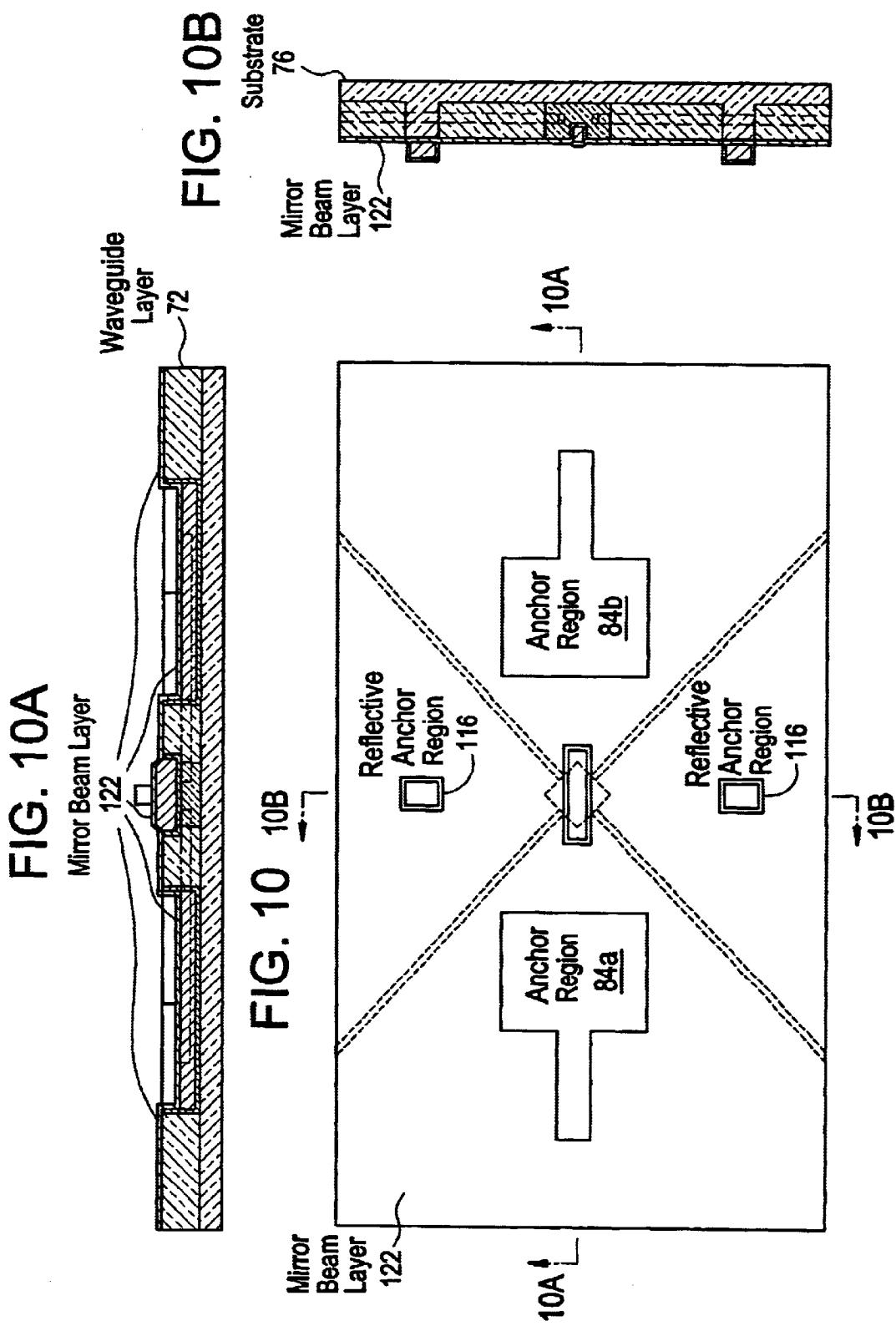

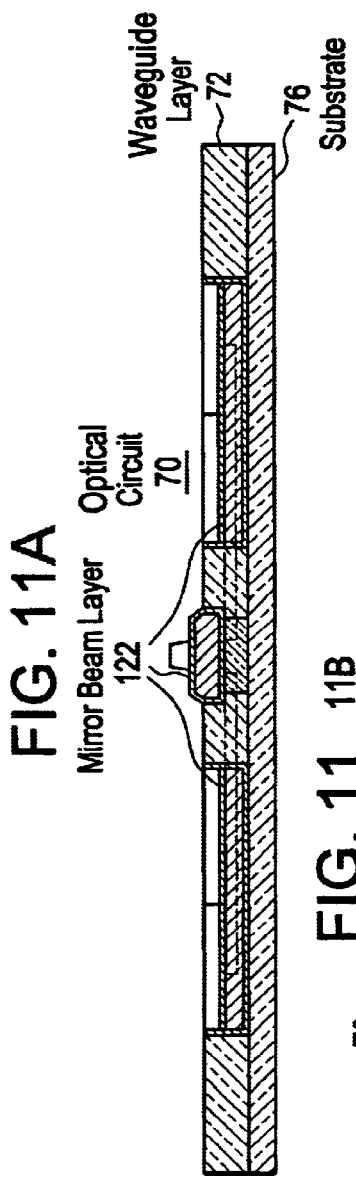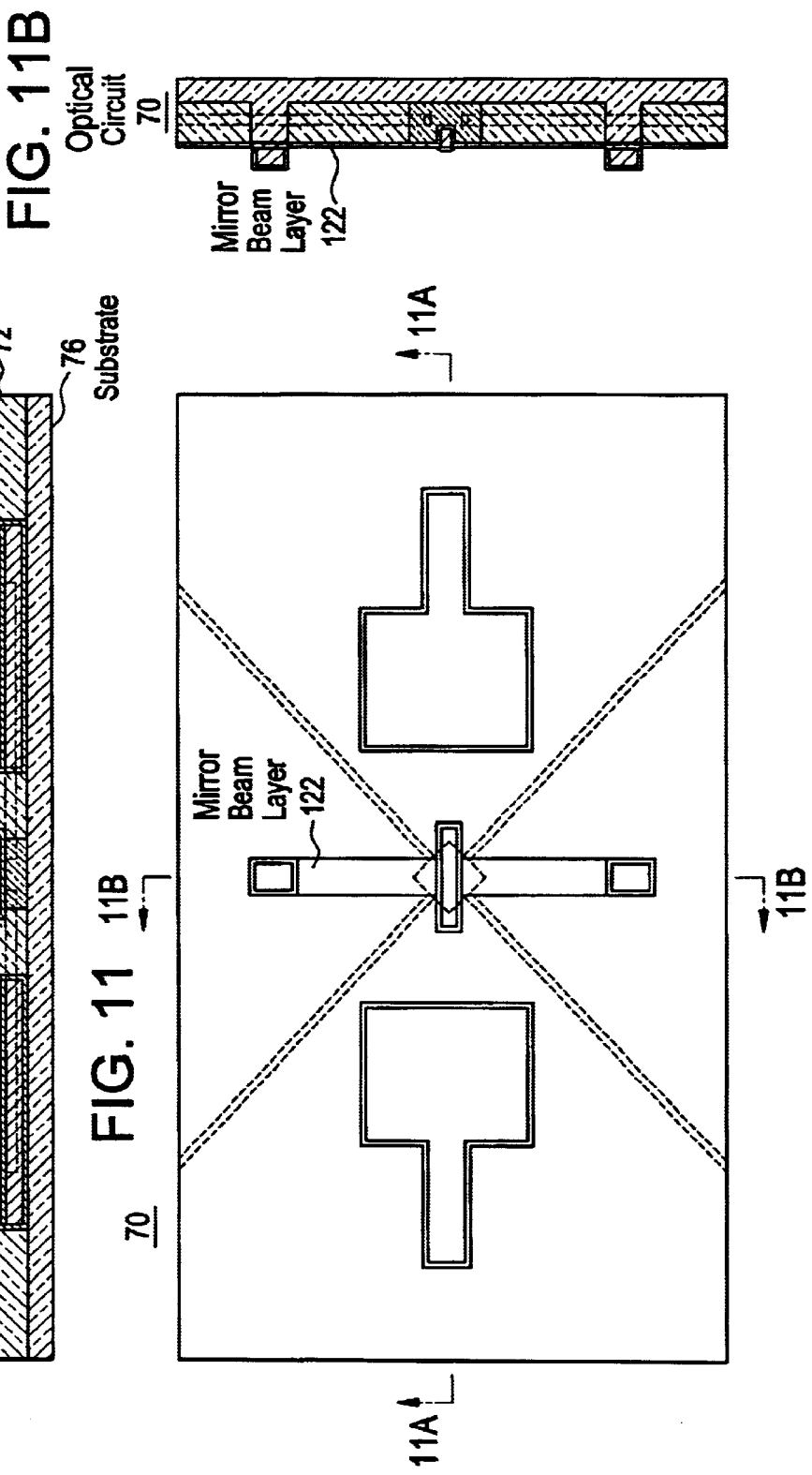

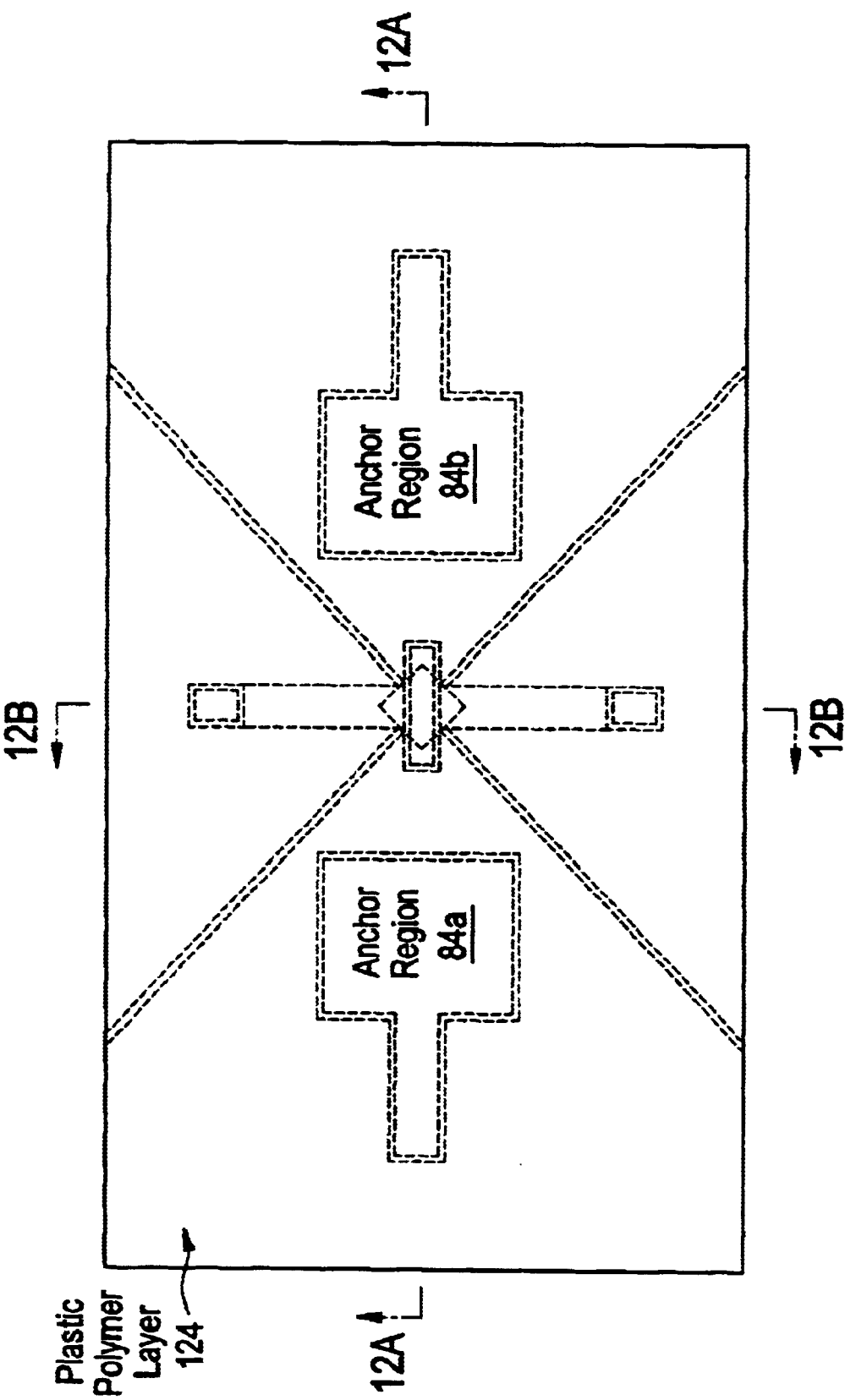

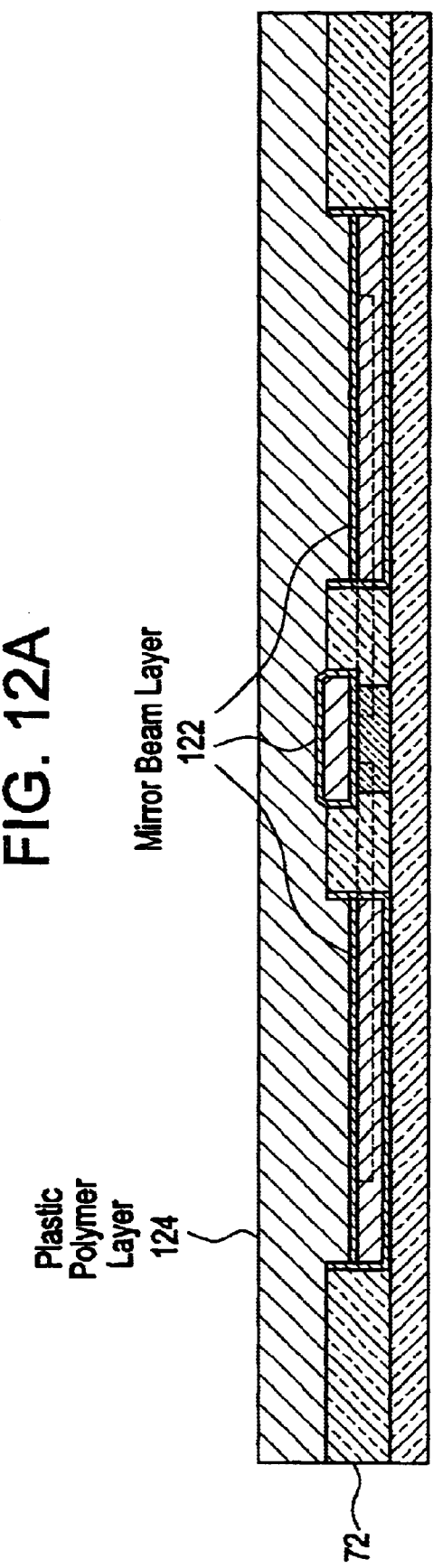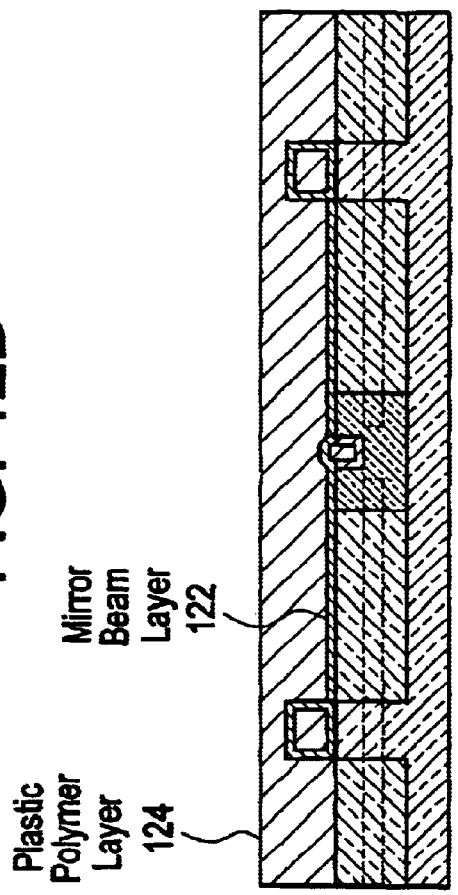

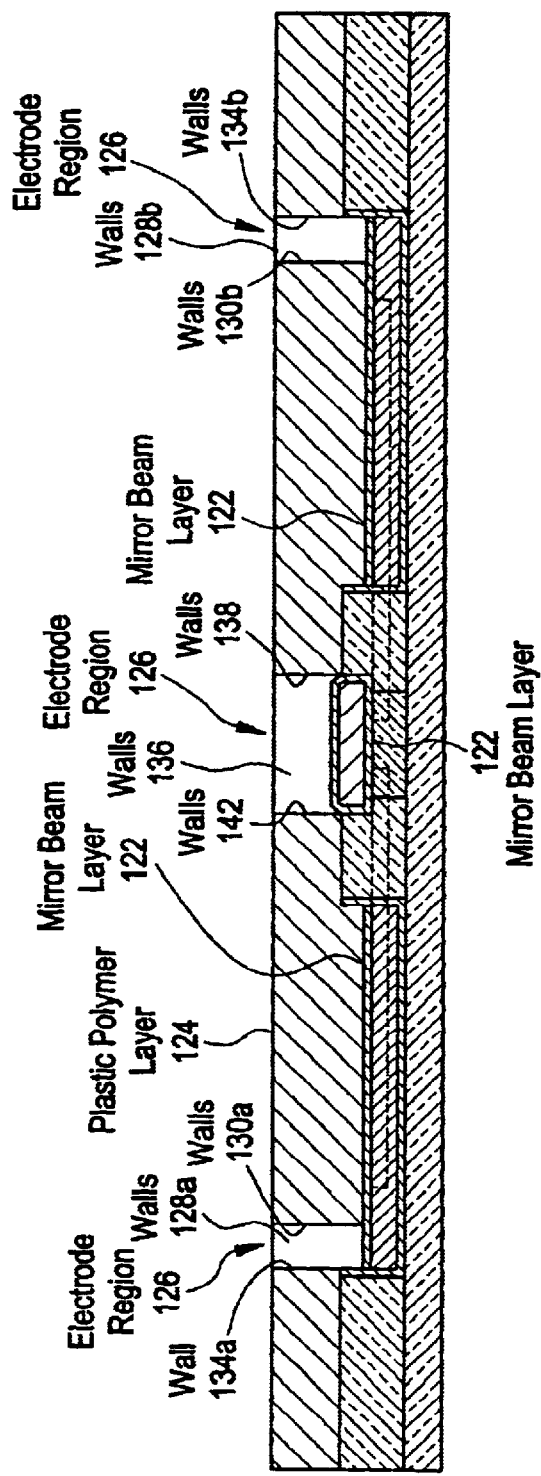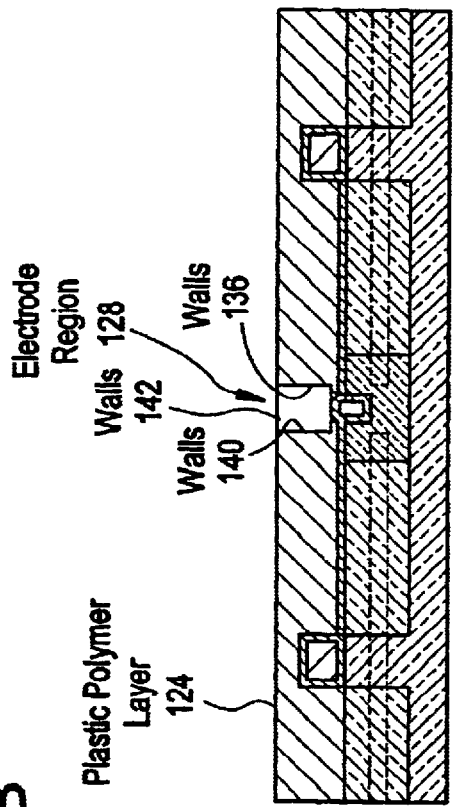
FIG. 13A
FIG. 13B

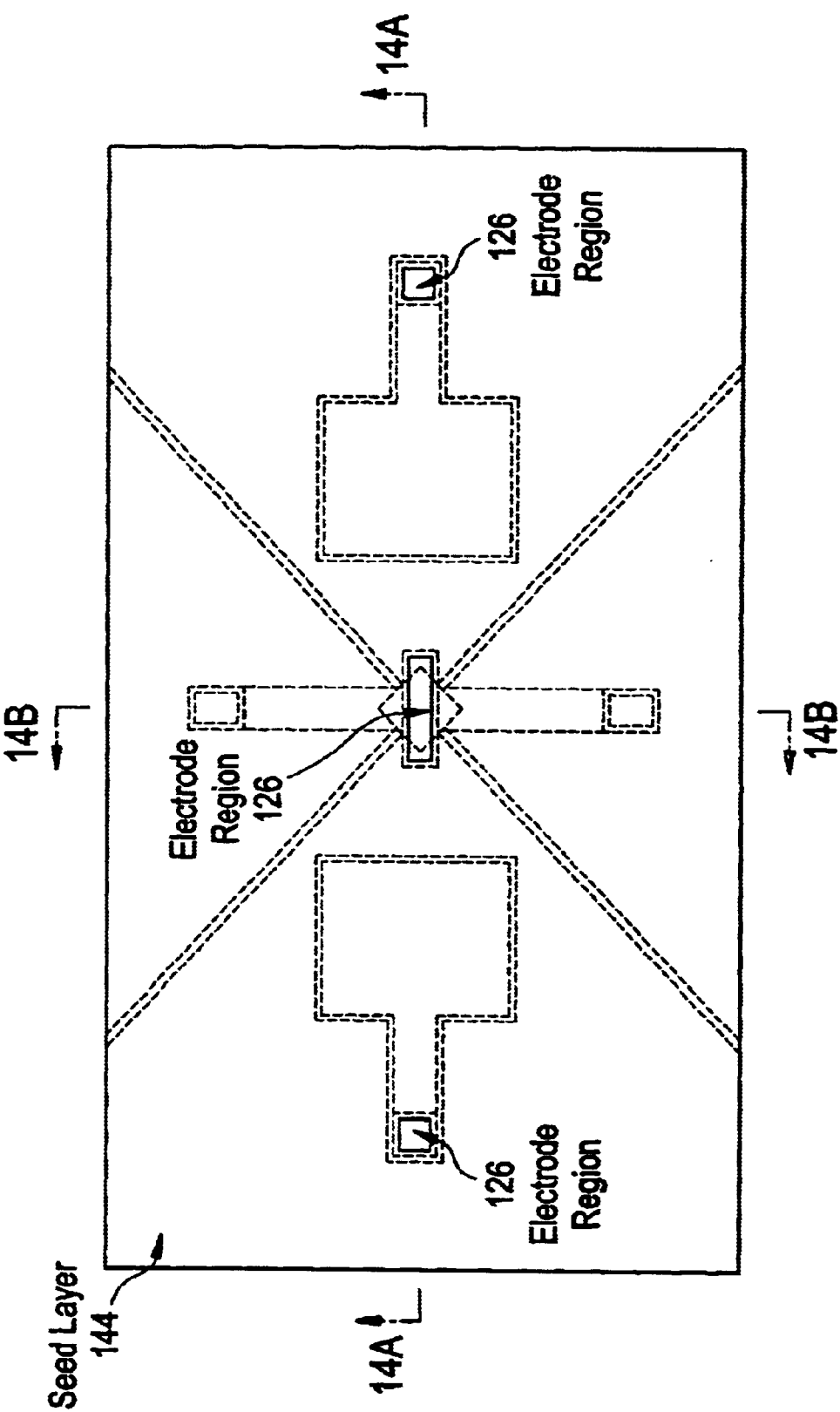

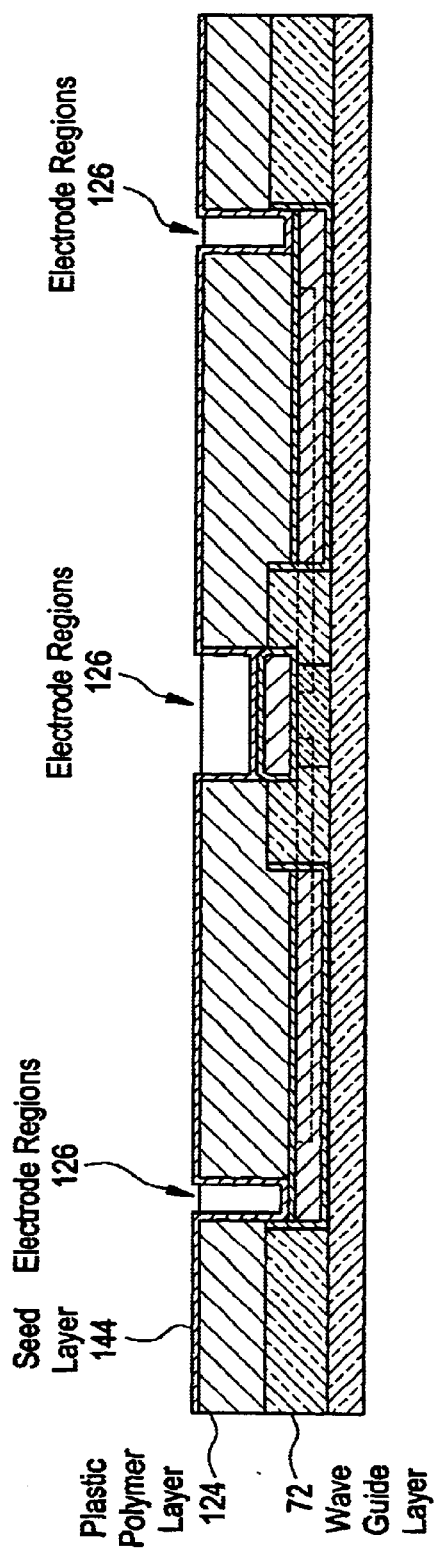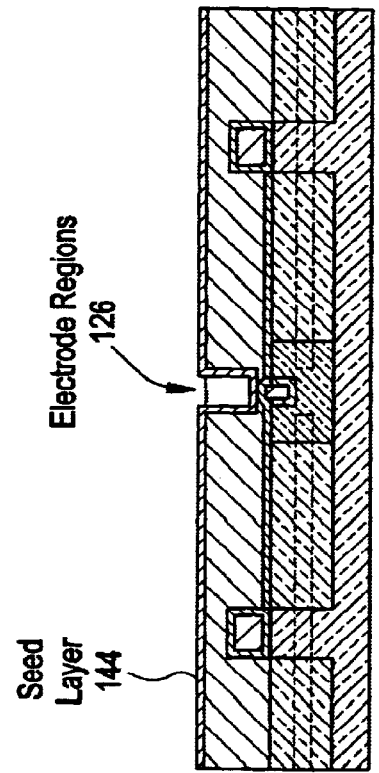

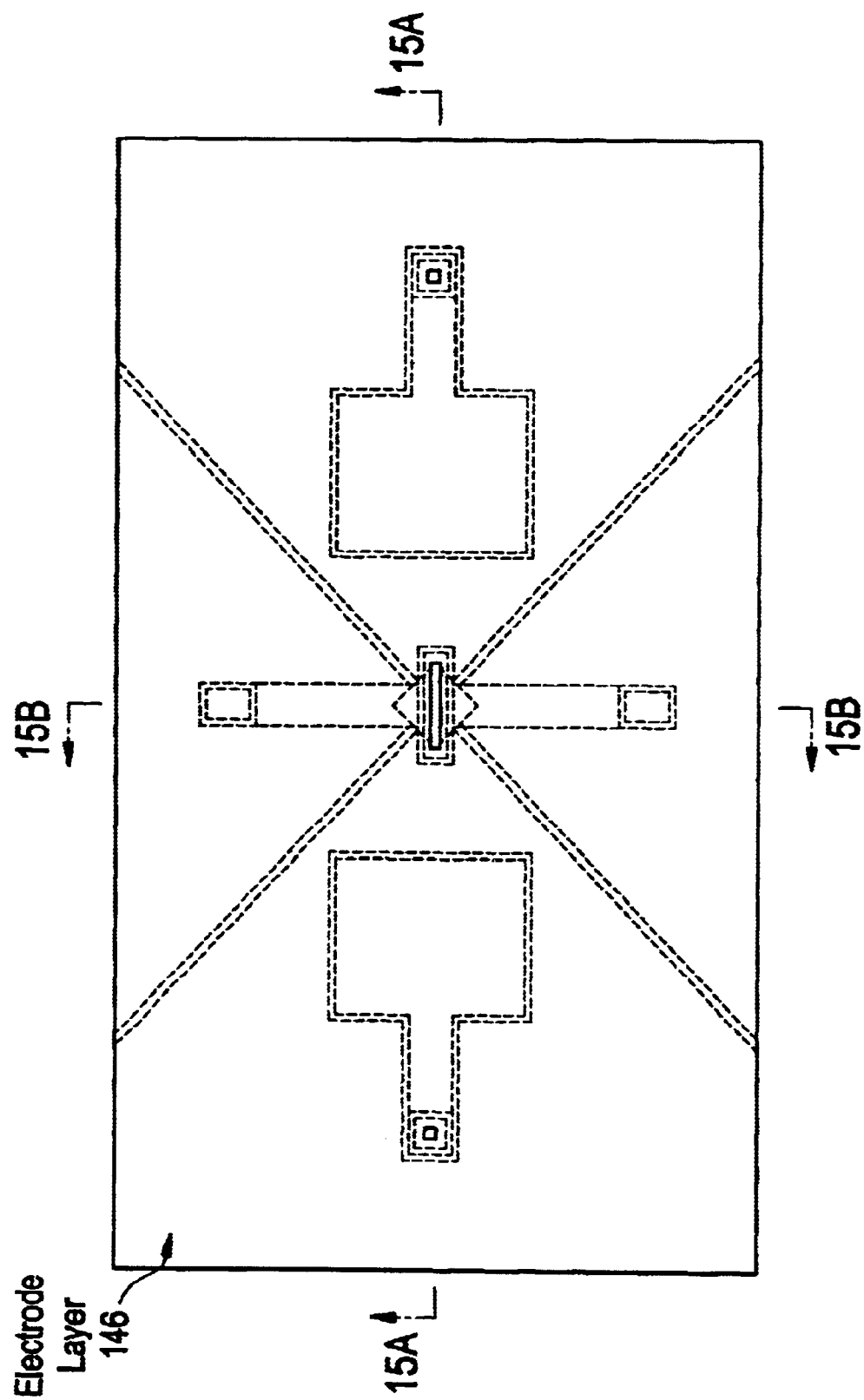

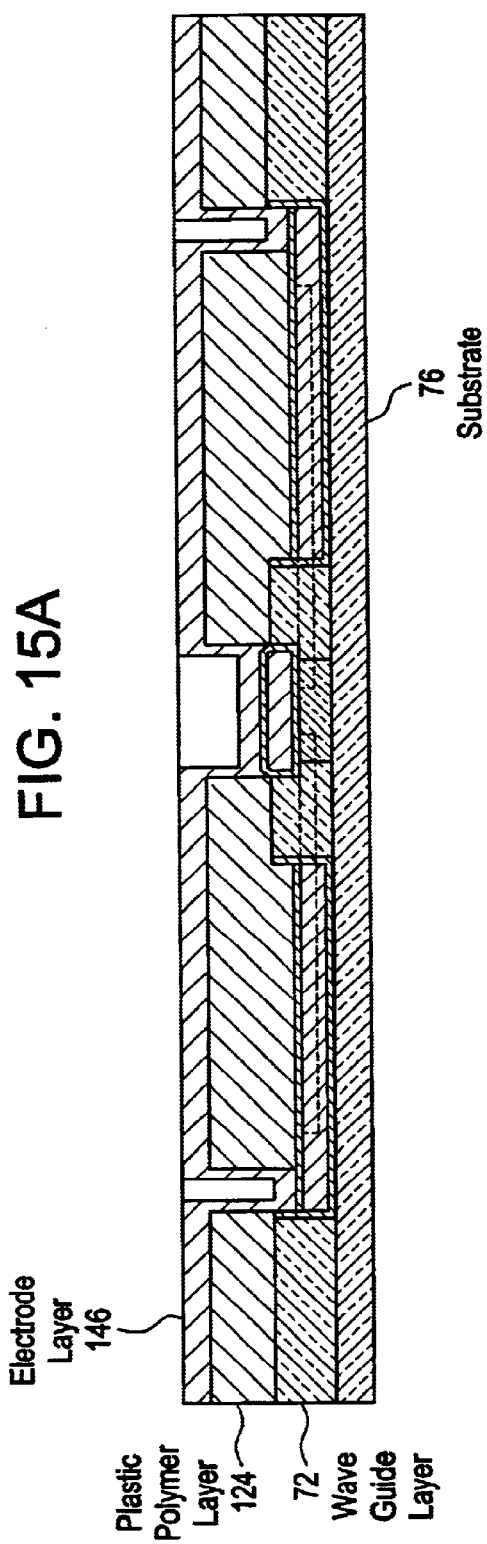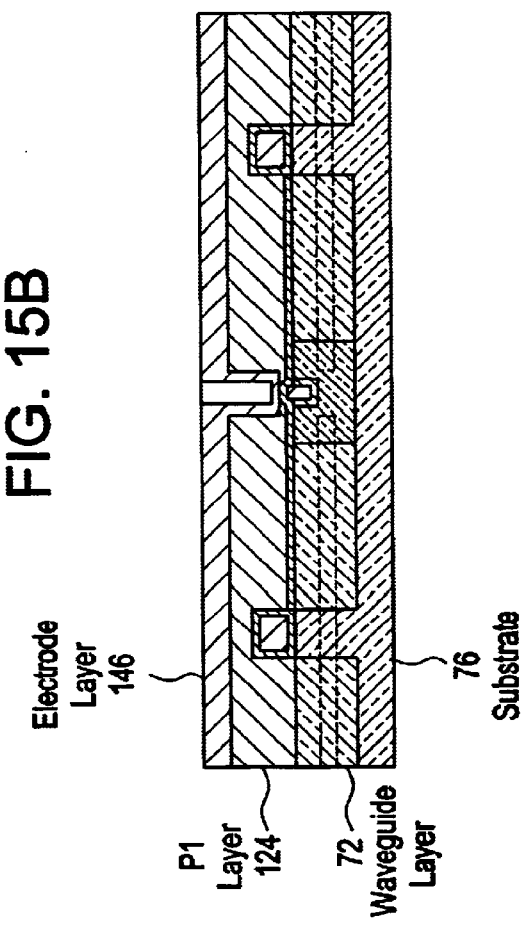

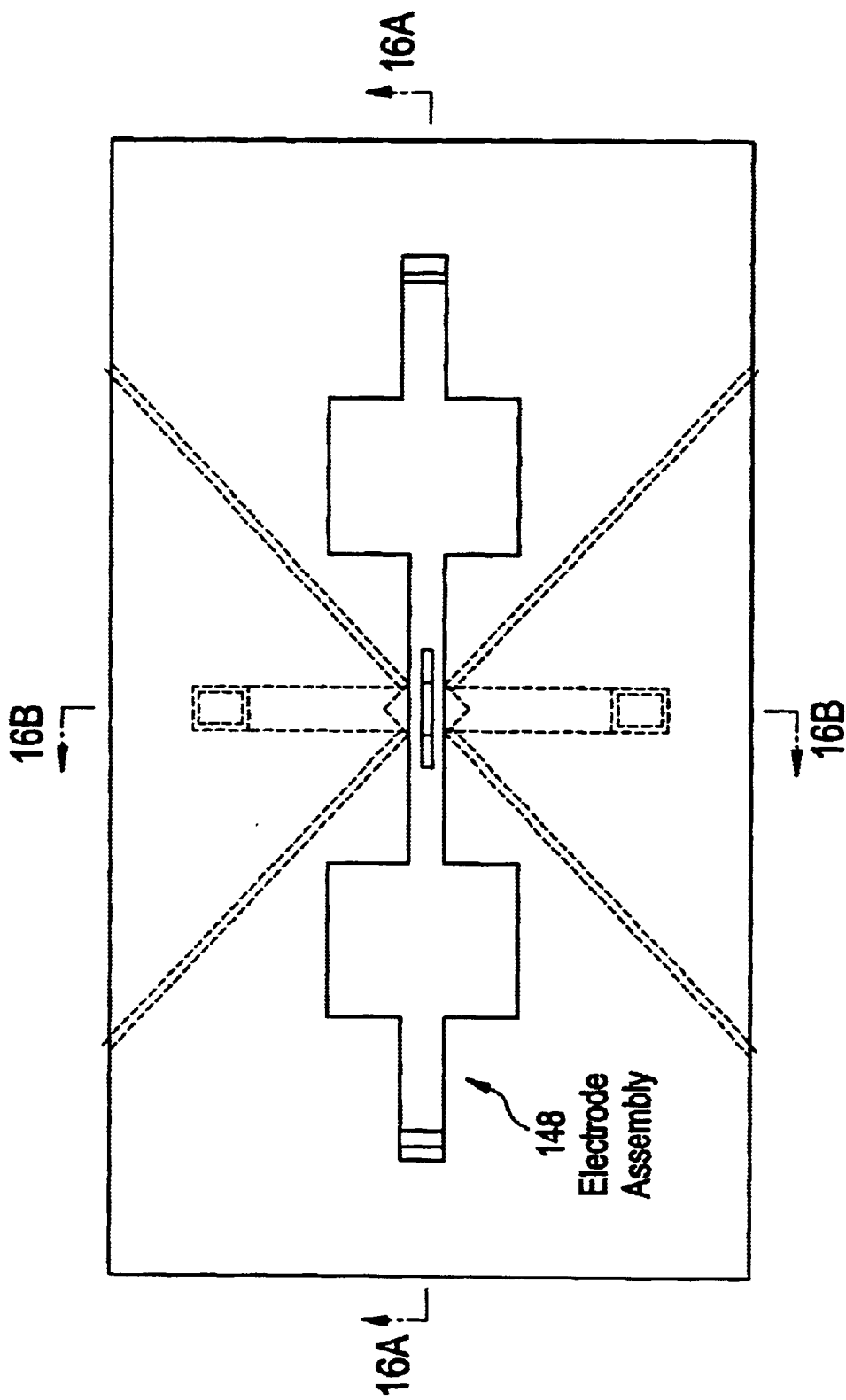

Electrode Assembly 148

Electrode Layer 146

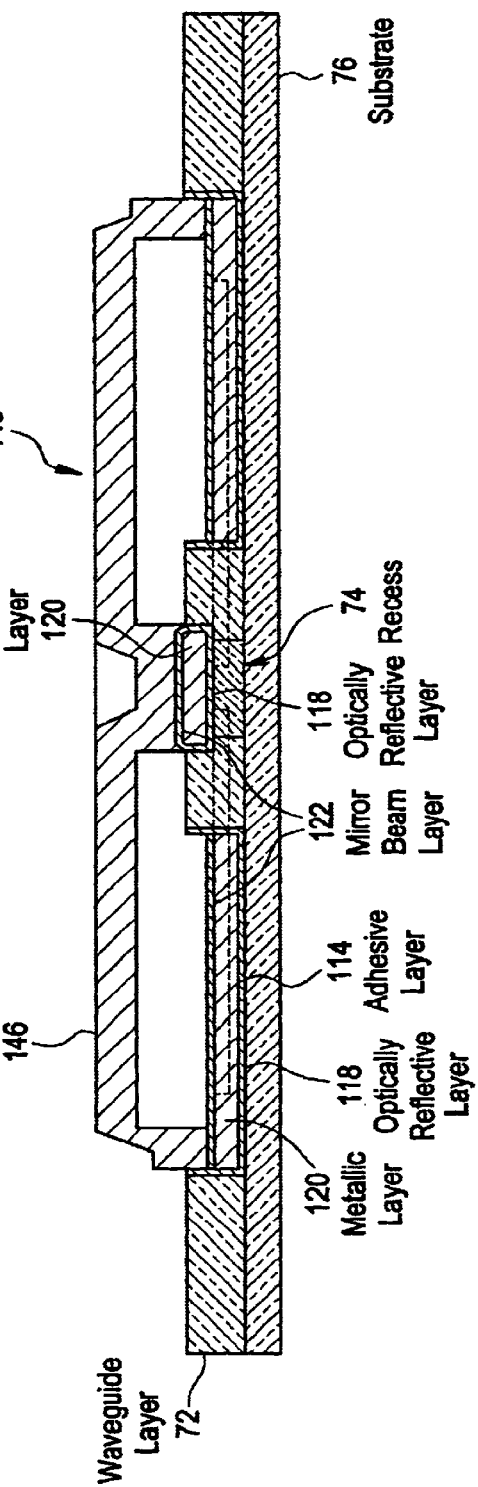
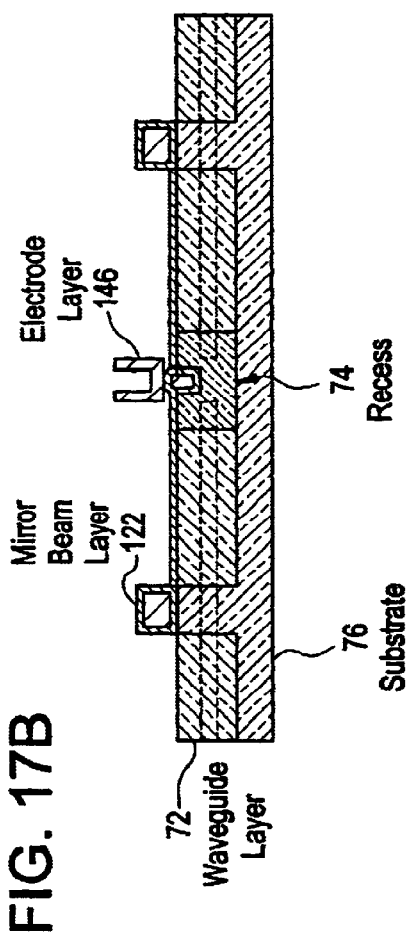
FIG. 17A
FIG. 17B

MEMS OPTICAL SWITCH ACTUATOR

BACKGROUND OF THE INVENTION

1. Field of the Invention

The present invention generally relates to optical switching. More particularly, the present invention relates to a micro-electro-mechanical-system optical switch actuator having an electrically conductive anchor assembly.

2. Technical Background

In the development of communications technologies, the primary objectives have always included the improvement of transmission fidelity, the increase of data rates, and the increase of distance between relay stations. The speed at which light travels and its potential to address all of these concerns logically led to attempts at optical communication. Early experiments with optical communications suggested the feasibility of modulating a coherent optical carrier wave at very high frequencies, but were commercially impractical because of the installation expense and the tremendous cost of developing the necessary components. The combination of semiconductor technology, which provided the necessary light sources and photodetectors, and optical waveguide technology, however, eventually enabled the development and use of optical fiber-based systems despite these initially perceived difficulties.

Optical networking involves the management and coordination of various functions such as optical transport and optical switching. Earlier approaches to optical switching actually involved the conversion of optical signals into electrical signals and the switching of the electrical signals. This type of electrical/optical conversion proved to be both difficult to implement and costly due to the required transformation into and out of the electrical domain. As a result, more recent approaches have attempted to perform switching in the optical domain.

Optical switching in the networking context presents its own set of unique concerns. For example, in order to efficiently manage the increasing number of optical signals and wavelength channels, optical switches must be significantly reduced in size. Micro-electro-mechanical-systems (MEMS) have recently been developed based on semiconductor processes, and applied in the areas of medicine, life science, sensors, aerospace, micro-satellites and data storage. MEMS technology allows conventionally large components to be reduced to sizes not previously available. While some attempts have been made at applying MEMS technology to optical switching in the networking context, certain concerns still remain.

One such concern is the design of the actuator for the optical switch. For example, thermal actuation schemes have been attempted, but often lead to difficult heating issues. In fact, the type of driving force that is used to operate the actuator is a crucial factor. It is therefore desirable to provide a MEMS optical switch actuator that does not use heat as a driving force.

While certain attempts have been made using electrostatic forces to actuate the optical switch, there is considerable room for improvement. For example, in the conventional electrostatic actuator approach, a pair of electrodes and various anchoring structures will be used to force a reflective element into and out of the path of an optical signal. The anchoring structures serve to attach the actuator to the optical circuit and provide the requisite stability for actuation. These approaches have typically been quite complex and require several fabrication steps in order to create the relatively high number of anchors and complex electrodes. It is therefore desirable to provide a MEMS optical switch actuator that operates in response to electrostatic driving forces, but does not require separate electrode and anchor assemblies.

As noted above, fabrication of MEMS actuators has proven to be quite difficult. For example, in order to generate sufficient force to manipulate a mirror (or reflective element), it is often necessary to provide a multi-level reflection assembly. Specifically, anchoring of the entire structure as well as manipulation of the mirror require widely varying amounts of structural support. Conventional actuators, however, have not addressed this issue to a sufficient level of specificity. It is therefore desirable to provide a method for fabricating a multi-level reflection assembly having an anchor assembly that also functions as an electrode.

SUMMARY OF THE INVENTION

In accordance with the present invention, a micro-electro-mechanical-system (MEMS) optical switch actuator is provided. The actuator has a reflective element assembly and a first electrode assembly for moving the reflective element assembly from a first position to a second position based on a switching signal. The actuator further includes an anchor assembly coupled to the reflective element assembly such that a spring force is generated in the reflective element assembly when the reflective element assembly is in the second position. The anchor assembly is electrically conductive such that the switching signal generates an electrostatic force between the anchor assembly and the first electrode assembly. Using the anchor assembly as an effective second electrode allows simplification of the actuator in a manner unachievable under conventional approaches.

In another aspect of the invention, a method for fabricating a MEMS optical switch actuator is provided. The method includes the step of coupling a multi-level reflection assembly to an optical circuit. The reflection assembly has an electrically conductive anchor assembly positioned at a first level with respect to the optical circuit, and a mirror positioned at a second level with respect to the optical circuit. An insulative mirror beam layer is then coupled to the reflection assembly, and an electrode assembly is coupled to the mirror beam layer. The electrode assembly is coupled such that a voltage potential between the anchor assembly and the electrode assembly causes the electrode assembly to force the mirror beam layer and the mirror from a first switching position to a second switching position. Positioning the anchor assembly at a different level from the mirror reduces the overall number of components and allows the fabrication process to be simplified beyond that available under conventional approaches.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute part of this specification. The drawings illustrate various features and embodiments of the invention, and together with the description serve to explain the principles and operation of the invention.

BRIEF DESCRIPTION OF THE DRAWINGS

The various advantages of the present invention will become apparent to one skilled in the art by reading the:

following specification and appended claims, and by referencing the following drawings, in which:

FIG. 3 is a plan view of an optical circuit in accordance with the present invention;

FIG. 3A is a cross sectional view taken along lines 3A—3A shown in FIG. 3 of the present invention;

FIG. 3B is a cross sectional view taken along lines 3B—3B shown in FIG. 3 of the present invention;

FIG. 4 is a plan view of the optical circuit shown in FIG. 3 having actuation anchor regions and a mirror region in accordance with the present invention;

FIG. 5 is a plan view of the optical circuit shown in FIG. 4 having a metallic layer in accordance with the present invention;

FIG. 5A is a cross sectional view taken along lines 5A—5A shown in FIG. 5 of the present invention;

FIG. 5B is a cross sectional view taken along lines 5B—5B shown in FIG. 5 of the present invention;

FIG. 6A is a cross sectional view taken along lines 6A—6A shown in FIG. 6 of the present invention;

FIG. 6B is a cross sectional view taken along lines 6B—6B shown in FIG. 6 of the present invention;

FIG. 7 is a plan view of the optical circuit shown in FIG. 6 having an adhesive layer disposed within actuation anchor regions and reflective anchor regions in accordance with the present invention;

FIG. 7A is a cross sectional view taken along lines 7A—7A shown in FIG. 7 of the present invention;

FIG. 7B is a cross sectional view taken along lines 7B—7B shown in FIG. 7 of the present invention;

FIG. 8 is a plan view of the optical circuit shown in FIG. 7 having an optically reflective layer deposited on the top surface of the waveguide layer, the actuation anchor regions, the mirror region, and the reflective anchor regions in accordance with the present invention;

FIG. 8A is a cross sectional view taken along lines 8A—8A shown in FIG. 8 of the present invention;

FIG. 8B is a cross sectional view taken along lines 8B—8B shown in FIG. 8 of the present invention;

FIG. 9 is a plan view of the optical circuit shown in FIG. 8 having a metallic layer deposited on an optically reflective layer in accordance with the present invention;

FIG. 9A is a cross sectional view taken along lines 9A—9A shown in FIG. 9 of the present invention;

FIG. 9B is a cross sectional view taken along lines 9B—9B shown in FIG. 9 of the present invention;

FIG. 10 is a plan view of the optical circuit shown in FIG. 9 having an insulative mirror beam layer deposited on a reflection assembly in accordance with the present invention;

FIG. 10A is a cross sectional view taken along lines 10A—10A shown in FIG. 10 of the present invention;

FIG. 10B is a cross sectional view taken along lines 10B—10B shown in FIG. 10 of the present invention;

FIG. 11 is a plan view of the optical circuit shown in FIG. 10 having a mirror beam layer etched from a portion of the top surface of a waveguide layer in accordance with the present invention;

FIG. 11A is a cross sectional view taken along lines 11A—11A shown in FIG. 11 of the present invention;

FIG. 11B is a cross sectional view taken along lines 11B—11B shown in FIG. 11 of the present invention;

FIG. 12 is a plan view of the optical circuit shown in FIG. 11 having a plastic polymer layer deposited on a top surface of a waveguide layer and a mirror beam layer in accordance with the present invention;

FIG. 12A is a cross sectional view taken along lines 12A—12A shown in FIG. 12 of the present invention;

FIG. 12B is a cross sectional view taken along lines 12B—12B shown in FIG. 12 of the present invention;

FIG. 13A is a cross sectional view taken along lines 13A—13A shown in FIG. 13 of the present invention;

FIG. 13B is a cross sectional view taken along lines 13B—13B shown in FIG. 13 of the present invention;

FIG. 14 is a plan view of the optical circuit shown in FIG. 13 having a seed layer deposited on the top surface of the plastic polymer layer and electrode regions in accordance with the present invention;

FIG. 14A is a cross sectional view taken along lines 14A—14A shown in FIG. 14 of the present invention;

FIG. 14B is a cross sectional view taken along lines 14B—14B shown in FIG. 14 of the present invention;

FIG. 15 is a plan view of the optical circuit shown in FIG. 15 having an electrode layer deposited on the seed layer in accordance with the present invention;

FIG. 15A is a cross sectional view taken along lines 15A—15A shown in FIG. 15 of the present invention;

FIG. 15B is a cross sectional view taken along lines 15B—15B shown in FIG. 15 of the present invention;

FIG. 16 is a plan view of the optical circuit shown in FIG. 15 having the electrode layer masked and etched such that an electrode assembly is generated in accordance with the present invention;

FIG. 17A is a cross sectional view taken along lines 17A—17A shown in FIG. 17 of the present invention; and FIG. 17B is a cross sectional view taken along lines 17B—17B shown in FIG. 17 of the present invention.

DETAILED DESCRIPTION OF THE PREFERRED EMBODIMENTS

Figure 1:
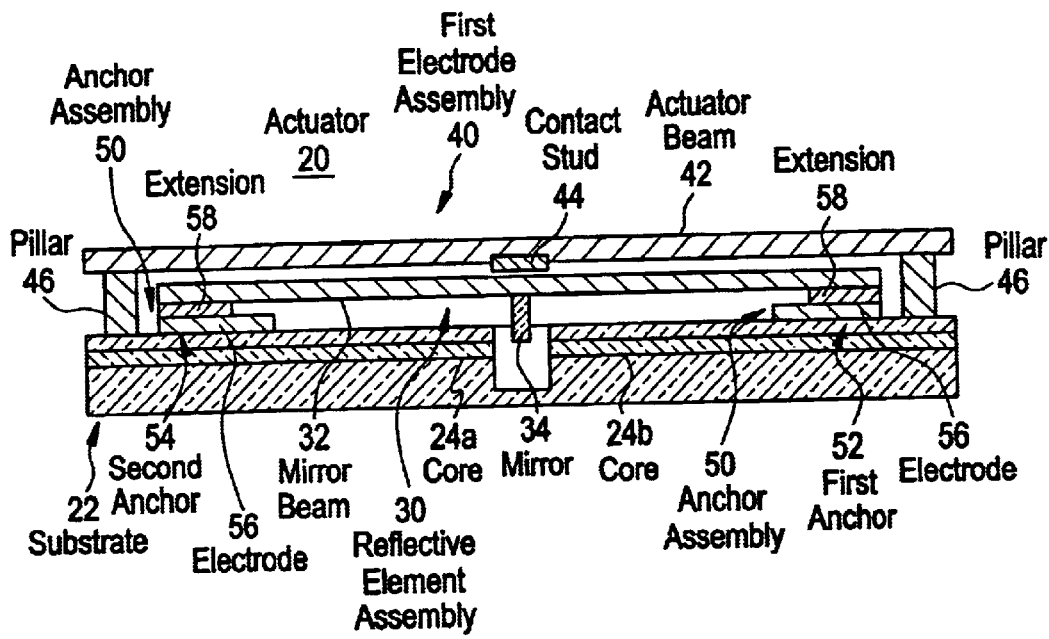
FIG. 1 is a side view of an optical switch actuator in accordance with the principals of one embodiment of the present invention.

Reference will now be made in detail to the present preferred embodiments of the invention, examples of which are illustrated in the accompanying drawings. Wherever possible, the same reference numerals will be used throughout the drawings to refer to the same or like parts.

Turning now to FIG. 1, a micro-electro-mechanical-system (MEMS) optical switch actuator 20 is shown. Generally, the actuator 20 has a reflective element assembly 30, a first electrode assembly 40, and an anchor assembly 50. The first electrode assembly 40 moves the reflective element assembly 30 from a first position to a second position based on an applied switching signal. The reflective element assembly 30 is shown as being in the first position. The anchor assembly 50 is coupled to the reflective element assembly 30 such that a spring force is generated in the reflective element assembly 30 when the reflective element 30 is in the second position. It is important to note that the anchor assembly 50 is electrically conductive such that the switching signal generates an electrostatic force between the anchor assembly 50 and the first electrode assembly 40.

It can be seen that the reflective element assembly 30 preferably includes a non-electrically conductive (i.e., insulative) mirror beam 32 and a mirror 34 coupled to the mirror beam 32. The dielectric nature of the mirror beam 32 allows an electric field to be generated between the first electrode assembly 40 and the anchor assembly 50 when the switching signal is applied. Suspending the mirror 34 from a dielectric material provides a much more compact configuration than available under conventional approaches.

It can further be seen that the first electrode assembly 40 has an actuator beam 42, and a contact stud 44 coupled to the actuator beam 42. A pillar structure supports the actuator beam 42 adjacent to the reflective element assembly 30 such that the contact stud 44 moves the reflective element assembly 30 from the first position (shown in FIG. 1) to the second position in response to the switching signal. The preferred pillar structure includes a dual pillar architecture 46 for supporting the actuator beam 42 at a first end and a second end.

Figure 2:
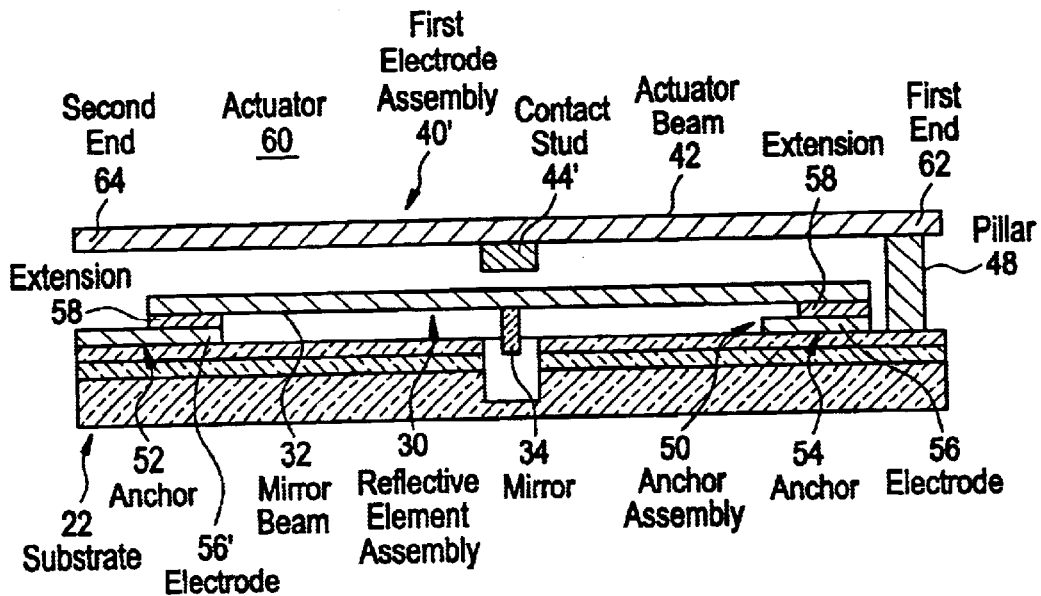
FIG. 2 is a side view of an optical switch actuator in accordance with the principals of an alternative embodiment of the present invention.

FIG. 2 demonstrates a MEMS optical switch actuator 60 with an alternative pillar structure. In this embodiment, the pillar structure includes a single pillar architecture 48 for supporting the actuator beam 42 at a first end 62 such that a second end 64 of the actuator beam 42 is free standing. This approach requires greater stress control in the actuator beam 42, but may provide enhanced torque and therefore improved actuation.

The contact stud 44' is larger in size than in the preferred embodiment, and may optionally have a non-cubical shape (e.g. rounded). Rounding the contact stud 44' will allow the first electrode assembly 40' to accommodate for the additional moments associated with the single pillar design.

Returning now to FIG. 1, it will be appreciated that the dual pillar architecture 46 need not be deposited directly upon the light wave optical circuit (LOC) substrate 22. In fact, it is important to note that the LOC substrate 22 must be made of a dielectric material in order to maintain electrical isolation between the first electrode assembly 40 and the anchor assembly 50 if substrate deposition is chosen. As will be discussed below, another approach could be to deposit the dual pillar architecture 46 directly upon the mirror beam 32.

The anchor assembly 50 will now be described in greater detail. Specifically, the anchor assembly 50 preferably includes a first anchor 52 for supporting the reflective element assembly 30 at a first end, and a second anchor 54 for supporting the reflective element assembly 30 at a second end. Each anchor 52, 54 preferably includes an electrode 56, and an extension 58 coupled to the electrode 56 and the reflective element assembly 30.

In operation, light will propagate along core portions 24a and 24b when the reflective element assembly 30 is in the first position (i.e., at equilibrium). When a voltage potential is applied between the first electrode assembly 40 and the anchor assembly 50, the actuator beam 42 and the contact stud 44 will be drawn in the downward direction towards the LOC substrate 22. The contact stud 44 will therefore come into contact with the mirror beam 32 such that the mirror beam 32 and the mirror 34 are forced downward. The mirror 34 will intersect the propagation path of the light traveling through the core portions 24. Thus, if the light is traveling from left to right, the reflective surface of the mirror 34 will direct the light away from core portion 24b. Thus, with proper design of the core portions, optical switching can be performed in any number of configurations.

It will also be appreciated that the present invention provides a method for fabricating a MEMS optical switch actuator. Generally, FIGS. 3–17B demonstrate one approach to such a fabrication in accordance with the present invention. Specifically, FIGS. 3, 3a and 3b show an optical circuit 70 to which the switch actuator of the present invention is coupled. The optical circuit 70 has a waveguide layer 72 and a recess 74. The waveguide layer 72 is coupled to a substrate 76, which has a plurality of protrusions 78 extending through the waveguide layer 72 to the top surface of the waveguide layer 72. The waveguide layer 72 also has a cladding portion 80 and a core portion 82. The cladding portion 80 and the core portion 82 have indices of refraction that enable light to propagate along the core portion 82 in a desired path.

As will be discussed in greater detail below, the MEMS optical switch actuator is generally fabricated by coupling a multi-level reflection assembly to the optical circuit 70, where the reflection assembly has an electrically conductive anchor assembly positioned at a first level with respect to the optical circuit 70 and a mirror positioned at a second level with respect to the optical circuit 70. An insulative mirror beam layer is then coupled to the reflection assembly such that the mirror is suspended within the recess 74, and an electrode assembly is coupled to the mirror beam layer. The electrode assembly is coupled such that a voltage potential between the anchor assembly and the electrode assembly causes the electrode assembly to force the mirror beam layer and the mirror from a first switching position (at the first level) to a second switching position (in the path of the light).

Multi-level Reflection Assembly

Figure 4A:
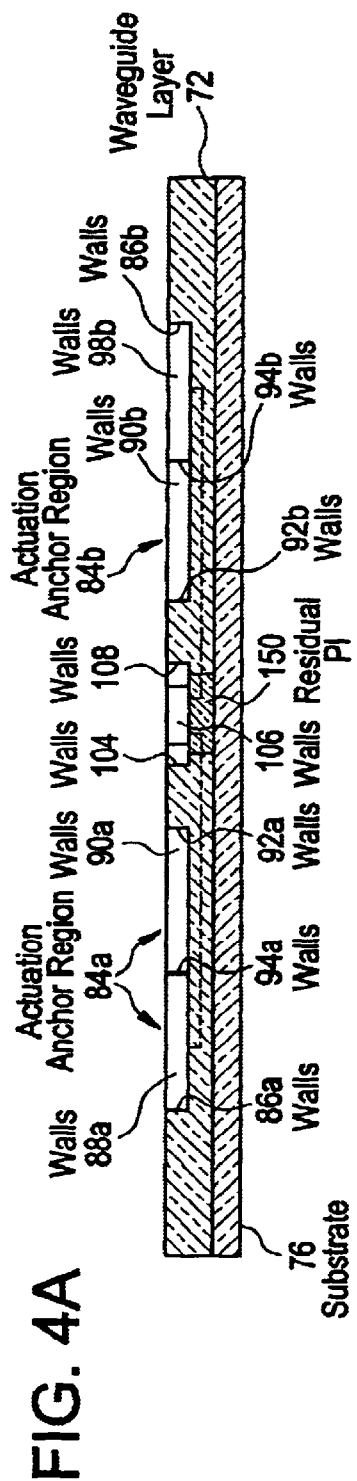
FIG. 4A is a cross sectional view taken along lines 4A—4A shown in FIG. 4 of the present invention.
Figure 4B:
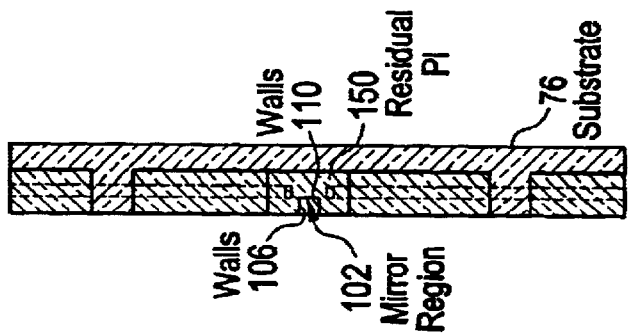
FIG. 4B is, a cross-sectional view taken along lines 4B—4B shown in FIG. 4 of the present invention.
Figure 6:
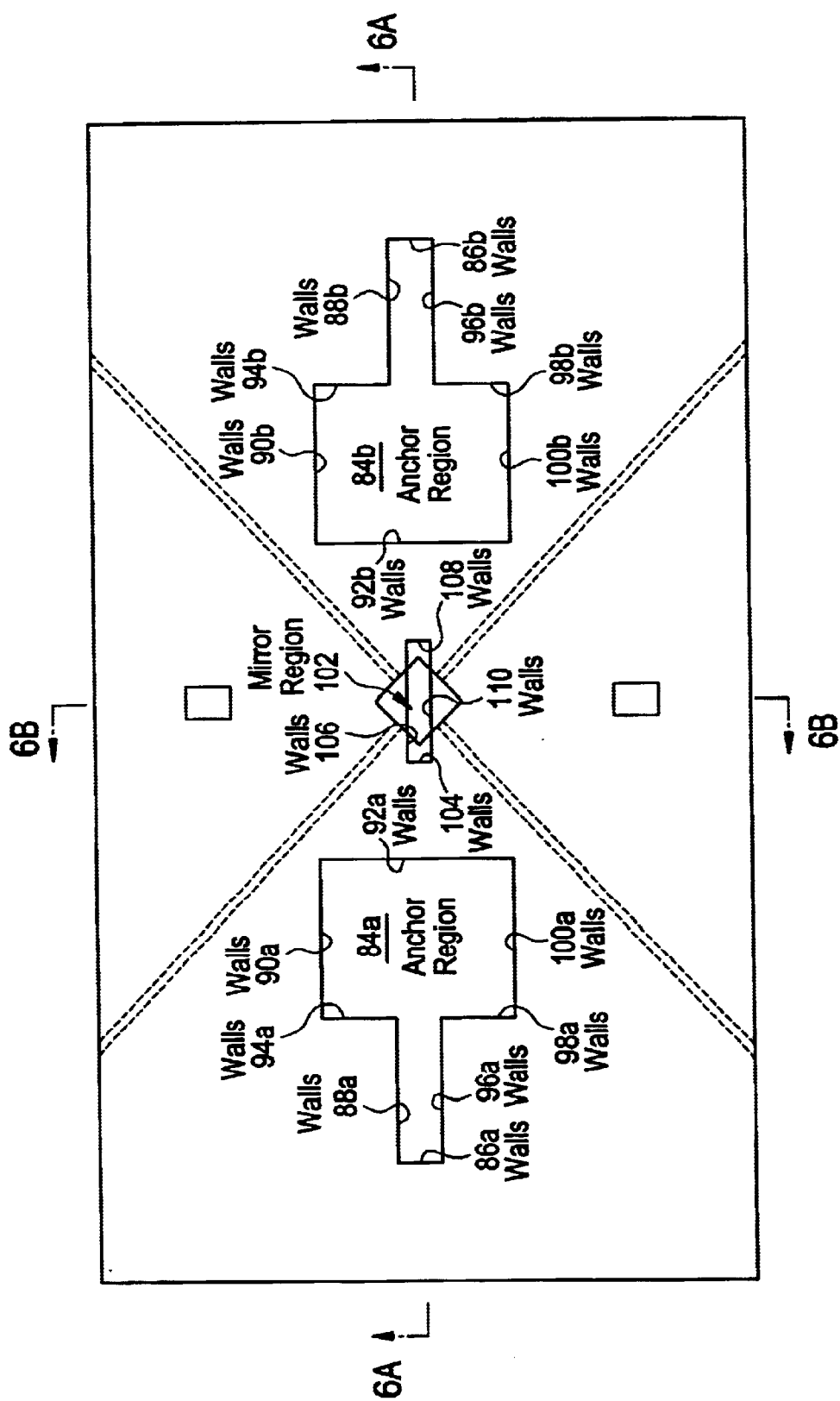
FIG. 6 is a plan view of the optical circuit shown in FIG. 5 having the actuation anchor regions etched to the top surface of a substrate in accordance with the present invention.

Turning now to FIGS. 4, 4a, and 4b, it can be seen that actuation anchor regions 84 are generated in the waveguide layer 72. The actuation anchor regions 84 are defined by walls 86, 88, 90, 92, 94, 96, 98, and 100 that extend from the top surface of the waveguide layer 72 to a top surface of the substrate 76. It is important to note that the walls defining the actuation anchor regions 84 extend only to an intermediate level within the waveguide layer 72 at this stage of the fabrication process. Subsequent steps, to be discussed below, will extend the actuation anchor regions 84 all the way to the top surface of the substrate 76 without modifying the walls that define a mirror region 102.

It can further be seen that the mirror region 102 is generated within the recess 74, and is defined by walls 104, 106, 108, and 110. The walls of the mirror region 102 extend from the top surface of the waveguide layer 72 to the intermediate level within the waveguide layer 72. As will be described in greater detail below, subsequent steps of the fabrication process dispose the anchor assembly within the actuation anchor regions 84, and dispose the mirror within the mirror region 102.

In order to generate the actuation anchor regions 84 and the mirror region 102, it is preferred that a plastic polymer layer be deposited on the top surface of the waveguide layer 72 and within the recess 74 of the waveguide layer 72. Approximately 20 micrometers of polyimide (PI) should be sufficient for this purpose. PI can withstand temperatures up to 400° F. and is an excellent insulator. A photoresist layer is then deposited on the PI layer, and the photoresist layer is patterned to open the mirror region 102 and the actuation anchor regions 84 from the top surface of the waveguide layer 72 to the intermediate level. Residual PI 150 remains in the recess 74 and will serve as a resting surface for the mirror to be described below.

Turning now to FIGS. 5, 5a, and 5b, it can be seen that the actuation anchor regions 84 are etched to the top surface of the substrate 76 by depositing a metallic layer 112 (such as titanium) on the top surface of the waveguide layer 72 and within the mirror region 102. The metallic layer 112 is then stripped in an acid dip (e.g., HF) to obtain the configuration shown in FIGS. 6, 6a, and 6b. Thus, the walls 86, 88, 90, 92, 94, 96, 98, and 100 extend from the top surface of the waveguide layer 72 to the top surface of the substrate 76. On the other hand, the walls 104, 106, 108, and 110 defining the mirror region 102 extend only to the intermediate level above the core portion 82 of the waveguide layer 72.

Turning now to FIGS. 7, 7a, and 7b, the beginning of the process of disposing the anchor assembly within the actuation anchor regions 84 and disposing the mirror within the mirror region 102 is shown. Specifically, an adhesive layer 114 is deposited on the top surface of the waveguide layer 72, within the mirror region 102, and within the actuation anchor regions 84. The preferred material for the adhesive layer 114 is Cr due to its ability to bond to glass. The adhesive layer 114 is then etched from the mirror region 102 and a portion of the top surface of the waveguide layer 72 such that the adhesive layer 114 remains in the actuation anchor regions 84 and in reflective anchor regions 116. The location of the reflective anchor regions 116 is essentially dictated by the location of the protrusions 78 of the substrate 76. This will ultimately allow all anchoring structures to be coupled to the substrate 76 which provides more structural support than the waveguide layer 72. In any event, the reflective anchor regions 116 are defined by the portion of the top surface of the waveguide layer 72 having the adhesive layer 114.

FIGS. 8, 8a, and 8b demonstrate the deposition of an optically reflective layer 118 on the top surface of the waveguide layer 72, within the actuation anchor regions 84, within the mirror region 102; and within the reflective anchor regions. The optically reflective layer 118 is preferably gold, and can be sputtered on at an approximately 2000 angstrom thickness. It is important to note that the optically reflective layer 118 will ultimately serve as the reflective surface for the mirror.

Turning now to FIGS. 9, 9a, and 9b, it can be seen that the optically reflective layer 118 is etched from the top surface of the waveguide layer, and a metallic layer 120 is deposited on the remaining optically reflective layer 118. The metallic layer 120, can be 3–4 micrometers of nickel, which can be wet etched in accordance with well-known fabrication techniques.

Mirror Beam Layer

FIGS. 10, 10a, and 10b demonstrate the process of depositing the insulative mirror beam layer 122 on the reflection assembly. It is important to note that the mirror beam layer is deposited under tensile stress in order to increase actuation forces. The mirror beam layer 122 is preferably approximately one micrometer thick and includes PECVD SiN. The mirror beam layer 122 is insulative in order to isolate the anchor regions 84, 116 (which also act as an electrode) from the electrode assembly to be described below.

As shown in FIGS. 11, 11a, and 11b, the mirror beam layer 122 is etched from a portion of the top surface of the waveguide layer 72 of the optical circuit 70 such that a bridge is formed. The bridge suspends the mirror of the multi-level reflection assembly at the first level with respect to the optical circuit.

Electrode Assembly

Figure 13:
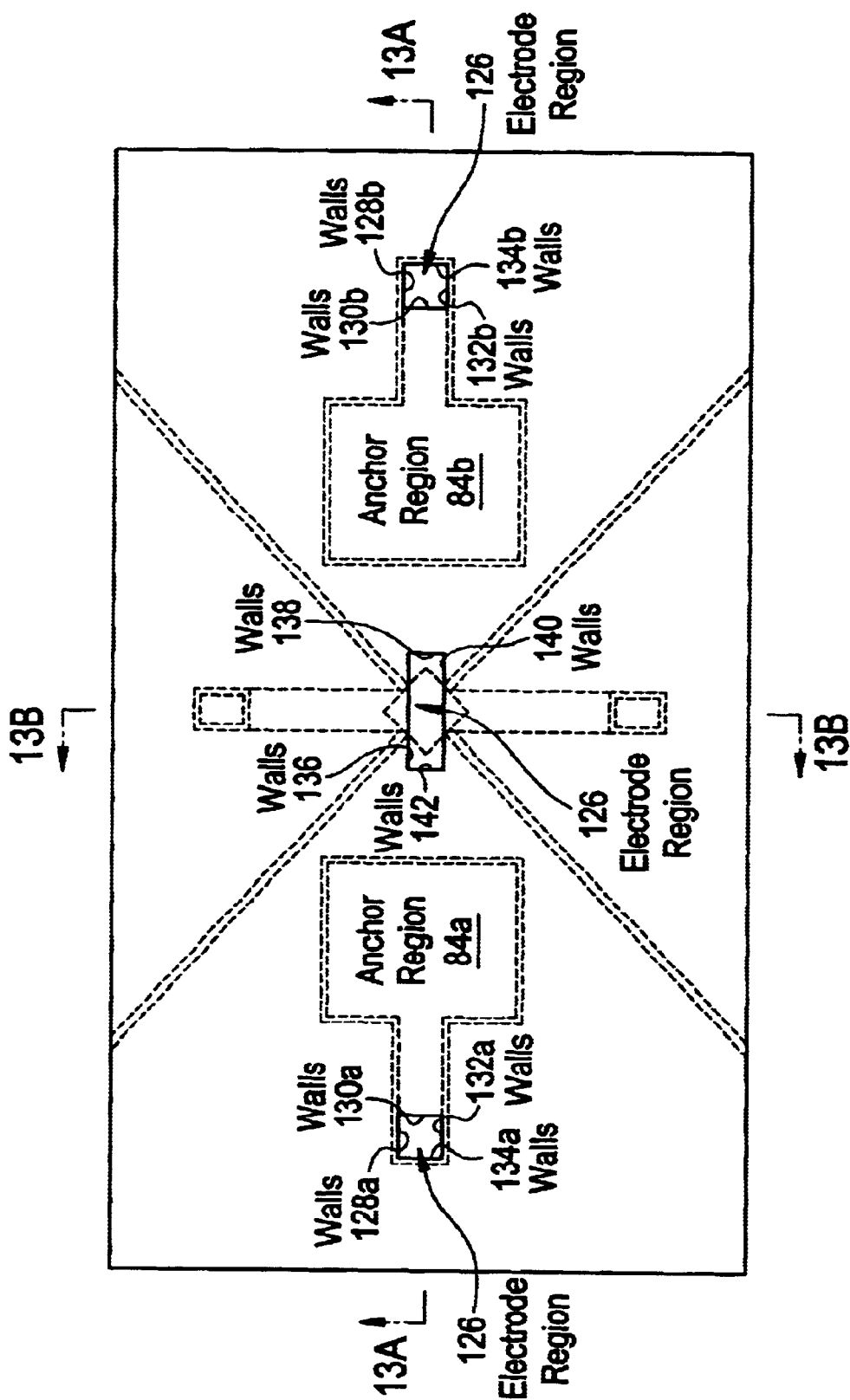
FIG. 13 is a plan view of the optical circuit shown in FIG. 12 having an etched metallic layer and plastic polymer layer such that electrode regions are generated in accordance with the present invention.

Turning now to FIGS. 12, 12a, and 12b, a plastic polymer layer 124 is deposited on the top surface of the waveguide layer 72 and on the mirror beam layer 122. Spinning on 12 micrometers of PI should be sufficient for this step. This thickness will ultimately determine the actuation distance of the electrode assembly. The PI layer 124 is then cured, and a metallic layer is deposited on the PI layer 124. The metallic layer can then be masked in a desired post-configuration. FIGS. 13, 13a, and 13b show that this allows the metallic layer and the PI layer 124 to be reactive ion etched such that electrode regions 126 are generated. The electrode regions 126 are defined by walls, 128, 130, 132, 134, 136, 138, 140 and 142 extending from the top surface of the PI layer 124 to the top surface of the mirror beam layer 122. An alternative to the above masking and etching steps would be to spin on a thick photoresist layer. This would allow the elimination of the need for masking as well as the metallic layer.

Turning now to FIGS. 14, 14a, and 14b, it can be seen that a seed layer 144 is deposited on the top surface of the PI layer 124 and within the electrode regions 126. The preferred seed layer 144 is approximately 3000 angstroms thick and includes Cr/Ni. Using Cr/Ni enables the seed layer to also act as an adhesive layer.

Figure 16A:
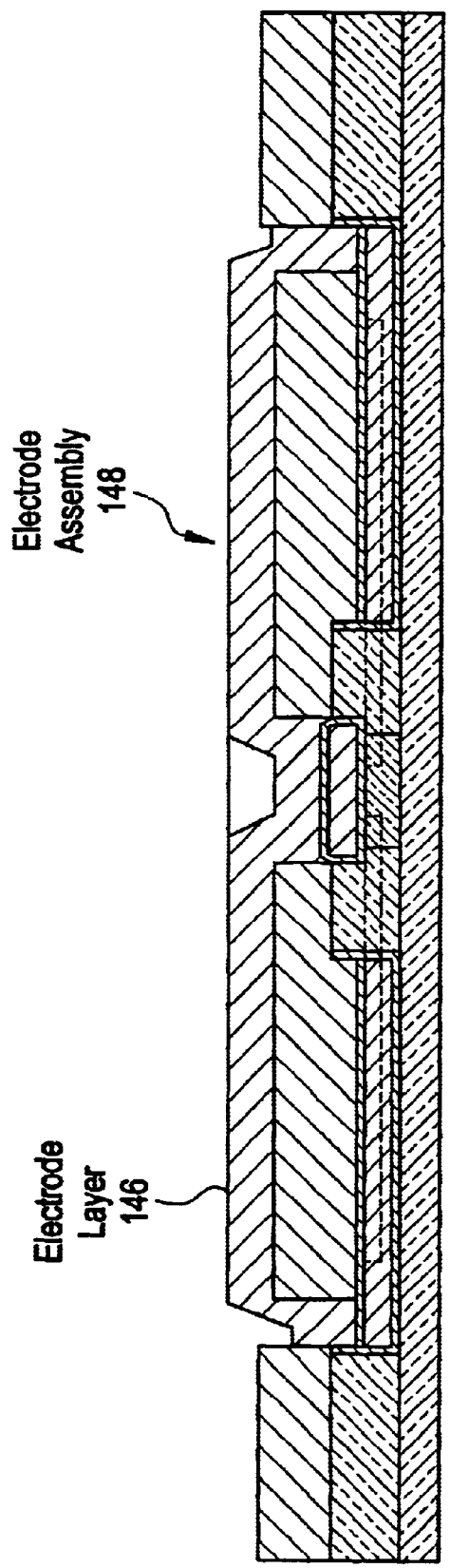
FIG. 16A is a cross sectional view taken along lines 16A—16A shown in FIG. 16 of the present invention.
Figure 16B:
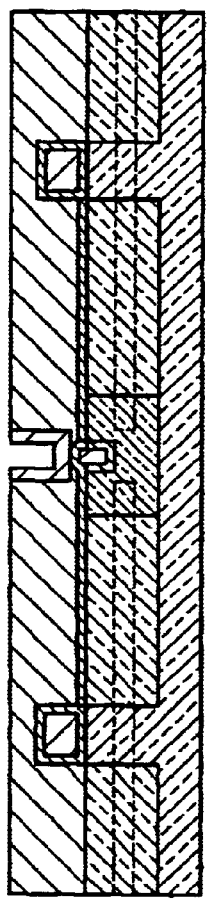
FIG. 16B is a cross sectional view taken along lines 16B—16B shown in FIG. 16 of the present invention.
Figure 17:
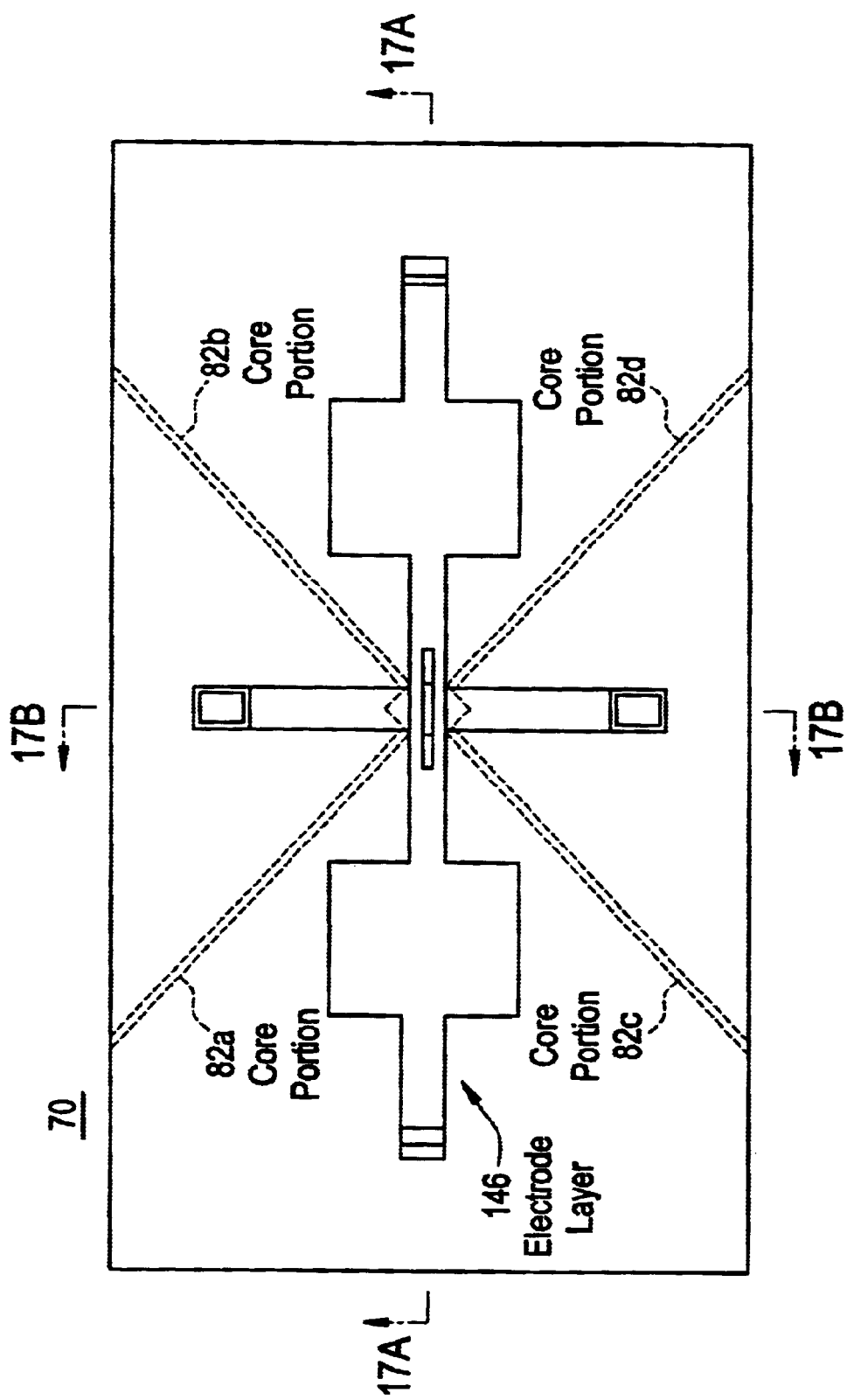
FIG. 17 is a plan view of the optical circuit shown in FIG. 16 having the plastic polymer layer removed in accordance with the present invention.

FIGS. 15, 15a, and 15b demonstrate the deposition of an electrode layer 146 on the seed layer by plating approximately 2 microns of nickel. As best seen in FIGS. 16, 16a, and 16b, the electrode layer 146 can then be masked in a desired bridge configuration and etched such that the electrode assembly 148 is generated. Finally, FIGS. 17, 17a, and 17b demonstrate that the PI layer can be removed to obtain a completed actuator. Another approach to the above "seeding" steps would be to plate the electrode layer, photoresist, and strip the unwanted portion.

In operation, a voltage potential is applied to the electrode layer 146 and the electrically conductive anchor assembly. The anchor assembly concludes the adhesive layer 114, the optically reflective layer 118, and the metallic layer 120. An electrostatic field is therefore created across the mirror beam layer 122 which forces the electrode layer 146 in a downward direction. Thus, light propagating down core portion 82a would be allowed to pass directly through to core portion 82d until the switching signal is applied. Upon application of the switching signal, the electrode layer 146 forces the mirror defined by optically reflective layer 118 and metallic layer 120 into the recess 74. This causes the light to be reflected down core portion 82b instead of core portion 82*d*. It is important to note that other waveguide configurations can be designed without parting from the spirit and scope of the invention.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A micro-electro-mechanical-system (MEMS) optical switch actuator comprising:
   a reflective element assembly;
   a first electrode assembly for linearly moving the reflective element assembly from a first position to a second position based on a switching signal wherein the first electrode assembly includes an actuator beam, a contact stud coupled to the actuator beam and a pillar structure for supporting the actuator beam adjacent to the reflective element assembly such that the contact stud moves the reflective element assembly from the first position to the second position in response to the switching signal, wherein the pillar structure includes a single pillar architecture for supporting the actuator beam at a first end such that a second end of the actuator beam is free standing; and
   an anchor assembly coupled to the reflective element assembly such that a spring force is generated in the reflective element assembly when the reflective element assembly is in the second position, the anchor assembly being electrically conductive such that the switching signal generates an electrostatic force between the anchor assembly and the first electrode assembly.

2. The actuator of claim 1 wherein the pillar structure includes a dual pillar architecture for supporting the actuator beam at a first end and a second end.

3. The actuator of claim 1 wherein the reflective element assembly includes:
   a non-electrically conductive mirror beam; and
   a mirror coupled to the mirror beam.

4. A micro-electro-mechanical-system (MEMS) optical switch actuator comprising:
   a reflective element assembly;
   a first electrode assembly for linearly moving the reflective element assembly from a first position to a second position based on a switching signal; and
   an anchor assembly coupled to the reflective element assembly such that a spring force is generated in the reflective element assembly when the reflective element assembly is in the second position, the anchor assembly being electrically conductive such that the switching signal generates an electrostatic force between the anchor assembly and the first electrode assembly, wherein the anchor assembly includes:
   a first anchor for supporting the reflective element assembly at a first end; and
   a second anchor for supporting the reflective element assembly at a second end.

5. The actuator of claim 4 wherein each anchor includes:
   an electrode; and
   an extension coupled to the electrode and the reflective element assembly.

\* \* \* \* \*